(12) United States Patent
Fangman et al.

(10) Patent No.: US 8,804,705 B2
(45) Date of Patent: *Aug. 12, 2014

(54) SYSTEM AND METHOD FOR CONFIGURING AN IP TELEPHONY DEVICE

(71) Applicant: Voxpath Networks, Inc., Austin, TX (US)

(72) Inventors: Richard E. Fangman, Round Rock, TX (US); Jason D. Preston, Austin, TX (US); Kenneth Ryon, Leander, TX (US)

(73) Assignee: Voxpath Networks, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/729,398

(22) Filed: Dec. 28, 2012

(65) Prior Publication Data

US 2013/0114589 A1    May 9, 2013

Related U.S. Application Data

(63) Continuation of application No. 09/903,838, filed on Jul. 11, 2001, now Pat. No. 8,363,647.

(60) Provisional application No. 60/281,908, filed on Apr. 3, 2001.

(51) Int. Cl.

| | |
|---|---|
| *H04L 12/66* | (2006.01) |
| *H04L 29/12* | (2006.01) |
| *H04M 7/12* | (2006.01) |
| *H04M 7/00* | (2006.01) |
| *H04L 29/06* | (2006.01) |

(52) U.S. Cl.
CPC ............ *H04L 12/66* (2013.01); *H04L 61/2015* (2013.01); *H04L 61/2038* (2013.01); *H04L 61/2514* (2013.01); *H04L 61/2517* (2013.01); *H04L 29/12377* (2013.01); *H04L 63/0428* (2013.01); *H04M 7/1285* (2013.01); *H04L 29/12254* (2013.01); *H04L 65/1069* (2013.01); *H04L 65/608* (2013.01); *H04M 7/006* (2013.01); *H04L 65/1043* (2013.01); *H04L 29/12367* (2013.01); *H04L 63/0272* (2013.01); *H04L 29/06027* (2013.01); *H04L 29/12216* (2013.01); *H04L 29/125* (2013.01); *H04L 63/20* (2013.01); *H04L 61/2564* (2013.01)
USPC ........... 370/354; 370/352; 370/355; 370/401; 370/475

(58) Field of Classification Search
USPC ......... 370/352, 353, 354, 355, 401, 466, 475, 370/389
See application file for complete search history.

(56) References Cited

U.S. PATENT DOCUMENTS

| | | | |
|---|---|---|---|
| 5,790,548 A | 8/1998 | Sistanizadeh et al. | |
| 6,061,349 A * | 5/2000 | Coile et al. ................. | 370/389 |

(Continued)

OTHER PUBLICATIONS

Written Opinion, Application No. PCT/US02/10544, mailed Feb. 26, 2004.

(Continued)

*Primary Examiner* — Andrew Lai
*Assistant Examiner* — Andrew C Lee
(74) *Attorney, Agent, or Firm* — Abe Hershkovitz; Hershkovitz & Associates, PLLC

(57) ABSTRACT

A system and method for IP telephony are disclosed, including an IP telephone (IPT) and a Service Gateway (SG). The SG receives an identifier, e.g., a vendor class identifier, included in a DHCP discover message from the IP telephone and determines the identifier's validity. If so, the SG issues a DHCP offer comprising DHCP lease information to the IP telephone, including a range of port numbers assigned to the IP telephone based on the identifier, where the range of port numbers comprises ports which are not reserved for use by other IP protocols. The DHCP lease information includes information indicating operational software for the IP telephone which the IP telephone executes to enable IP communications. The SG mediates IP communications between the IP telephone and an IP device, where the IP telephone uses at least a subset of the range of port numbers to send or receive IP communications.

59 Claims, 22 Drawing Sheets

(56) References Cited

U.S. PATENT DOCUMENTS

| | | | |
|---|---|---|---|
| 6,073,178 A * | 6/2000 | Wong et al. ................. 709/229 |
| 6,097,719 A * | 8/2000 | Benash et al. ............... 370/352 |
| 6,178,455 B1 * | 1/2001 | Schutte et al. ............... 709/228 |
| 6,353,660 B1 * | 3/2002 | Burger et al. ............. 379/88.17 |
| 6,381,638 B1 * | 4/2002 | Mahler et al. ................ 709/220 |
| 6,496,867 B1 * | 12/2002 | Beser et al. ................. 709/245 |
| 6,515,997 B1 | 2/2003 | Feltner et al. |
| 6,529,499 B1 * | 3/2003 | Doshi et al. ................. 370/352 |
| 6,577,642 B1 * | 6/2003 | Fijolek et al. ............... 370/465 |
| 6,657,991 B1 * | 12/2003 | Akgun et al. ............... 370/352 |
| 6,687,245 B2 | 2/2004 | Fangman et al. |
| 6,697,862 B1 * | 2/2004 | Beser et al. ................. 709/226 |
| 6,738,362 B1 | 5/2004 | Xu et al. |
| 6,765,881 B1 * | 7/2004 | Rajakarunanayake ....... 370/256 |
| 6,772,210 B1 * | 8/2004 | Edholm ....................... 709/226 |
| 6,775,273 B1 | 8/2004 | Kung et al. |
| 6,798,751 B1 * | 9/2004 | Voit et al. .................... 370/252 |
| 6,822,957 B1 * | 11/2004 | Schuster et al. ............. 370/389 |
| 6,829,250 B2 * | 12/2004 | Voit et al. .................... 370/467 |
| 6,877,042 B2 | 4/2005 | Tawil et al. |
| 6,958,992 B2 | 10/2005 | Lee et al. |
| 6,980,526 B2 * | 12/2005 | Jang et al. ................... 370/260 |
| 7,002,973 B2 * | 2/2006 | MeLampy et al. ........... 370/401 |
| 2001/0043571 A1 * | 11/2001 | Jang et al. ................... 370/260 |
| 2002/0044567 A1 * | 4/2002 | Voit et al. .................... 370/467 |
| 2002/0052915 A1 * | 5/2002 | Amin-Salehi ................ 709/203 |
| 2002/0093915 A1 * | 7/2002 | Larson ......................... 370/235 |

OTHER PUBLICATIONS

A Radvision Technology White Paper "Traversal of IP Voice and Video Data through Firewalls and NATs", 2001, 18 pages.
Dynamicsoft SIP Firewall Control Proxy, 2001, 4 pages.
Dynamicsoft SIP Edge Proxy, 2001, 2 pages.

* cited by examiner

SYSTEM AND METHOD FOR CONFIGURING AN IP TELEPHONY DEVICE

CROSS-REFERENCE TO RELATED APPLICATIONS

This application is a continuation of U.S. application Ser. No. 09/903,838, filed Jul. 11, 2001, which claims benefit of priority from U.S. Provisional Application Ser. No. 60/281,908, filed Apr. 3, 2001, the disclosures of which are expressly incorporated by reference herein in their entireties.

FIELD OF THE INVENTION

The present invention relates to the field of telephony, and more particularly to Internet Protocol (IP) based telephony.

DESCRIPTION OF THE RELATED ART

Voice over Internet Protocol (VoIP) refers to the technology to make telephone calls and send faxes over IP-based data networks with a suitable quality of service (QoS) and superior cost/benefit. The main justifications for development of VoIP can be summarized as follows:

Cost reduction—VoIP technologies can provide substantial savings in long distance telephone costs, which is extremely important to most companies, particularly those with international markets.

Simplification—An integrated voice/data network allows more standardization and reduces total equipment needs.

Consolidation—The ability to eliminate points of failure, consolidate accounting systems and combine operations, providing for more efficient operations.

Advanced Applications—The long run benefits of VoIP include support for multimedia and multi-service applications, for which current telephone systems are not equipped.

Growth in the VoIP market is expected to be considerable over the near future. However, there remain many challenges facing developers of VoIP equipment, both in terms of voice quality, latency and packet loss as well as call control and system management. The primary challenges are: the severe restrictions on acquisition and use of registered IP version 4 addresses, the resulting need to use Network Address Translation (NAT) and related technologies, the limitations of existing firewall technologies, and the application layer requirements of VoIP protocols such as MEGACO, RTP, and RTCP.

The American Registry for Internet Numbers (ARIN) has placed severe restrictions on the allocation of routable, public IP addresses due to the popular growth on the Internet, and the rapid depletion of remaining available addresses. In order to conserve address space, ARIN strongly encourages end users to utilize NAT technology to conserve address space. The most common implementation of NAT is NAPT, or Network Address Port Translation. This allows a single public IP address to be used to support thousands of hosts using private (RFC 1918) addresses. The major problem with NAT is that it only modifies the source IP address and port information in the IP header, and not anywhere in the payload. A typical VoIP protocol uses the IP and port information of the host in the payload for caller identification and call routing. Thus, when a Media Gateway Controller (MGC) or Trunking Gateway (TG) receives communication from an end-node with conflicting information, considerable problems may result. Note that as used herein, the term "Trunking Gateway" refers to any device that simultaneously receives multiple analog inputs and encodes the signal into multiple corresponding IP data streams. A Trunking Gateway may also perform the reverse function of simultaneously taking multiple signals encoded into a multiple IP data streams and converting it to multiple corresponding analog signals.

The NAT process is also dynamic, and so a host will be associated with a specific port number only during the session in progress. The next session will almost assuredly be over a different port. This problem is exacerbated by the fact that two end nodes that need to communicate directly may be using the same private IP address.

Another issue relates to the firewall. Firewalls are typically designed to protect internal networks from external networks, and generally need to be aware of when sessions open and close so that the network does not remain vulnerable. Most protocols used on the Internet are TCP based, and thus the firewall can determine when sessions are opened and closed based on SYN and FIN messages. Unfortunately, most VoIP protocols are UDP based, and therefore do not utilize SYN and FIN messages that the firewall can detect. Complicating matters further, VoIP protocols often use pairs of ports for communication, initiated from both the inside and outside of the network. Firewalls tend to support single port communication only initiated from the inside. Additionally, triangulated communications between IP telephones present a particular problem, referred to as the "triangle problem", described below.

The traditional solution to an upper-layer protocol that does not work with NAT is an Application Level Gateway (ALG). An ALG acts as a proxy by modifying the IP address and header information in the payload of the various protocols being used (MEGACO, RTP, RTCP) to match the information replaced by the standard NAT function. Additionally, the ALG typically "negotiates" with the NAT gateway to reserve any specific port or port ranges necessary to support the protocols. This has been done for a variety of protocols such as ICMP and FTP, and lately H.323 and SIP (two earlier VoIP standards), and solves the basic problem of public IP to private IP communication. What are not addressed are the more complex interactions such as triangulated routing shown in FIG. 1. As FIG. 1 shows, a Media Gateway Controller (MGC) 50 is coupled to Application Level Gateway 70. The AGL 70 is coupled to two IP telephones 20A and 20B, respectively. The IP telephones 20 are also coupled to one another directly. If IP telephone 20A contacts Media Gateway Controller 50 for Call Setup through ALG 70, the MGC 50 contacts IP telephone 20B (on the same network as IP telephone 20A) through ALG 70, and IP telephone 20B attempts to contact IP telephone 20A on the local network, the ALG 70 between IP telephones 20A and 20B must be sophisticated enough to only correct the private address information when appropriate.

The above problem may become very complex considering that the ALG 70 must maintain a local table of all internal hosts (IP telephones 20), examine the call destination address information coming from the MGC 50, and decide whether or not to modify it when routing it to the internal hosts 20. The alternative would be to route all traffic through the ALG 70 regardless of whether the destination is in the internal network, perform the ALG function, then the NAT function twice, then the ALG function again, and then route it back out the same interface. This convoluted process would be required for every single packet, introducing substantial inefficiencies to the system.

SUMMARY OF THE INVENTION

The present invention includes various embodiments of a system and method for performing IP telephony. Therefore, improved systems and methods for IP telephony are desired.

In one embodiment, the system may include a network, at least one Media Gateway, such as an IP telephone or Trunking Gateway, a Service Gateway, operable to couple to the Media Gateway through the network, and a Media Gateway Controller, operable to couple to the Service Gateway and the at least one Media Gateway through the network.

In one embodiment, the Media Gateway may be an IP (Internet Protocol) telephone. The IP telephone may first be activated. In response, the Service Gateway may negotiate a client DHCP lease with the IP telephone. The Service Gateway may use an identifier, e.g., a vendor ID, of the IP telephone to determine a range of port numbers to assign to the IP telephone. In other words, the Service Gateway may receive the identifier from the IP telephone, and if the identifier is valid, assign the port range to the IP telephone. In one embodiment, the Service Gateway may receive a MAC ID of the IP telephone in addition to the vendor ID. The Service Gateway may determine if the MAC ID for the IP telephone is valid, and if the MAC ID is determined to be valid, then determine if the identifier is valid.

The range of port numbers may include one or more port numbers which are not reserved for use by other IP protocols. The client DHCP lease negotiations may include the IP telephone issuing a DHCP discover message to the Service Gateway, which may then issue a DHCP offer to the IP telephone if the identifier is determined to be valid. The DHCP offer may include DHCP lease information based on the validated identifier, such as the range of port numbers and information indicating operational software for the IP telephone. The Service Gateway may store the DHCP lease information. The IP telephone may store the DHCP lease information, and enable DHCP settings included in the DHCP lease information.

The Service Gateway and the IP telephone may then operate to initialize the IP telephone. In one embodiment, the IP telephone may be initialized by executing the indicated operational software to enable IP communications. In one embodiment, the IP telephone may issue a request for the operational software, after which the Service Gateway may provide the operational software to the IP telephone, which may then execute the provided operational software to enable IP communications. In one embodiment, the IP telephone may issue a read request to a file transfer server, e.g., a Trivial File Transfer Protocol (TFTP) Server, for the operational software, which may then provide the operation software to the IP telephone. In one embodiment, the file transfer server may be included in the Service Gateway.

In one embodiment, the IP telephone may be registered by the system, e.g., by the Media Gateway Controller, prior to the Call Setup process. For example, the IP telephone may send a public IP address of the IP telephone to the Media Gateway Controller, which may receive and store the public IP address of the IP telephone. In one embodiment, the IP telephone may also send a private IP address of the IP telephone to the Media Gateway Controller, which may receive and store the private IP address of the IP telephone. The Media Gateway Controller may be operable to use the public IP address and the port range to determine the private IP address, for example, by using look-up tables.

After the registration, IP communications may be performed using the IP telephone, using one or more ports in the range of assigned ports. For example, the Service Gateway may mediate IP communications between the IP telephone and an IP device, such as another IP telephone, or a Trunking Gateway, among others.

In one embodiment, performing IP communications using the IP telephone may include the Service Gateway receiving a data packet from the IP telephone, including a private source IP address, a source port number in the assigned range of port numbers, and destination information associated with an IP device. The Service Gateway may then perform a Network Address Persistent Port Translation (NAPPT) on the data packet, and send the data packet to the IP device. Performing NAPPT on the data packet may include changing the private source IP address to a public source IP address while leaving the source port number unchanged, and where the public source IP address and the source port number may be used to uniquely identify the IP telephone.

In another embodiment, performing IP communications using the IP telephone may include the Service Gateway receiving a data packet from the IP device, including a public destination IP address, a destination port number in the assigned range of port numbers, and source information, where the public destination IP address and the destination port number may be used to uniquely identify the IP telephone. The Service Gateway may then perform a Network Address Persistent Port Translation (NAPPT) on the data packet, and send the data packet to the IP telephone. Performing NAPPT on the data packet received from the destination may include using the public destination IP address and the destination port number to uniquely identify the IP telephone, and changing the public destination IP address to a private source IP address of the IP telephone while leaving the destination port number unchanged.

In one embodiment, various embodiments of the methods described above may be included in a memory medium. In another embodiment, various embodiments of the methods described above may be included in a plurality of memory mediums, which may include one or more of an IP telephone memory medium storing IP telephone program instructions, a Service Gateway memory medium storing Service Gateway program instructions, and a Media Gateway Controller memory medium storing Media Gateway Controller program instructions, where the program instructions included in the plurality of memory mediums may be executable to perform various embodiments of the methods described above.

In one embodiment, the system may include the network, two or more Media Gateways coupled through the network, as well as the Media Gateway Controller, coupled to the Media Gateways through the network.

In one embodiment, the Media Gateway Controller may receive a Call Setup request, where the Call Setup request may include a source IP address and a destination telephone number. The Media Gateway Controller may select a first Media Gateway based on the source IP address, and a second Media Gateway based on the destination telephone number.

The Media Gateway Controller may compare a public IP address of the first Media Gateway to a public IP address of the second Media Gateway, and if the public IP address of the first Media Gateway is the same as the public IP address of the second Media Gateway, may select a private IP address of the first Media Gateway and a private IP address of the second Media Gateway for Call Setup. Note that if the public IP addresses of the Media Gateways are the same, then they are internal to the system. If the public IP address of the first Media Gateway is not the same as the public IP address of the second Media Gateway, the Media Gateway Controller may select the public IP address of the first Media Gateway and the public IP address of the second Media Gateway for Call Setup. This describes a case when a call session is between an internal IP telephone (e.g., the first Media Gateway), and an external device, such as a telephone, communicating through a Trunking Gateway (e.g., the second Media Gateway). Thus, in one embodiment, the first Media Gateway and the second Media Gateway may each include one of an IP telephone or a Trunking Gateway, where the Trunking Gateway includes an interface to the Public Switched Telephone Network (PSTN).

In one embodiment, the Media Gateway Controller may send the selected IP address of the first Media Gateway to the second Media Gateway, and send the selected IP address of the second Media Gateway to the first Media Gateway. The first Media Gateway may then send data to the second Media Gateway using the selected IP address of the second Media Gateway, and the second Media Gateway may send data to the first Media Gateway using the selected IP address of the first Media Gateway.

In one embodiment, the Media Gateway Controller may register the first and second Media Gateways prior to receiving the Call Setup request, as described above. In one embodiment, registering the Media Gateways may include receiving and storing the public IP address of each Media Gateway. In another embodiment, registering the Media Gateways may also include receiving and storing the private IP address of each Media Gateway.

Thus, various embodiments of the system and method described above may distinguish between call sessions involving two internal IP telephones, and call sessions between an internal IP telephone and a Trunking Gateway, for example, interfacing with an external device, such as an external telephone.

BRIEF DESCRIPTION OF THE DRAWINGS

A better understanding of the present invention can be obtained when the following detailed description of the preferred embodiment is considered in conjunction with the following drawings, in which.

Figure 1:
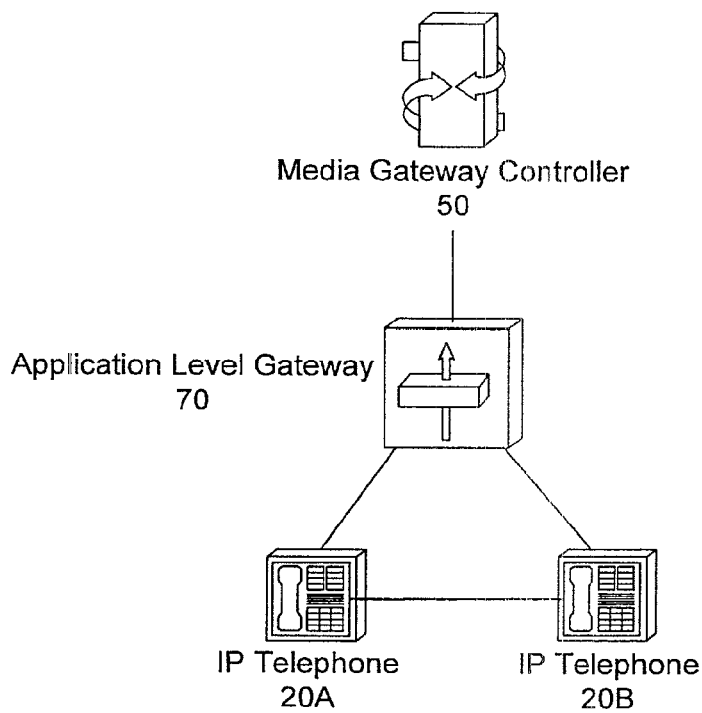
FIG. 1 illustrates an IP telephony system, according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
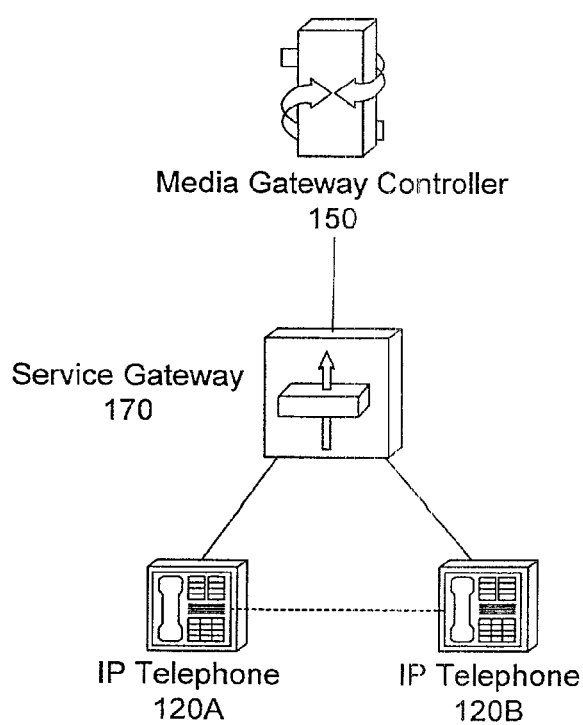
FIG. 2 illustrates an IP telephony system, according to one embodiment of the present invention.

FIG. 2—A VoIP System

FIG. 2 illustrates one embodiment of a VoIP system for providing IP telephony services to a business or other organization. The system in FIG. 2 includes one or more IP telephones 120A and 120B. As used herein, the terms "IP telephone" and "Media Gateway" are intended to include any telephony or communication device that operates to use a network protocol, such as Internet Protocol (IP). Thus, an IP telephone 120 is a Media Gateway, as is a Trunking Gateway. Said another way, an IP telephone or Media Gateway is a device that receives an analog input and encodes the signal into an IP data stream. This device may also perform the reverse function of taking a signal encoded into an IP data stream and converting it to an analog signal. Although in the preferred embodiment, IP is the network protocol used, use of other network protocols is also contemplated. Note that wireless embodiments of the invention are also contemplated. It should also be noted that in some embodiments of the VoIP system, communications may be mediated between an IP telephone 120 and an IP device, where the IP device may be any device with an interface capable of sending or receiving Internet Protocol packets, including another IP telephone.

As FIG. 2 shows, IP telephones 120A and 120B may be coupled to a Service Gateway (SG) 170. As used herein, the term "Service Gateway" is intended to include any system or device that operates to mediate telecommunications, e.g., telephone calls, between the IP telephones 120 (or other Media Gateways), as well as between the IP telephones 120 and external devices (e.g. IP devices), such as telephones on other networks, Trunking Gateways, or telephones or devices on the PSTN (Public Switched Telephone Network), ISDN (Integrated Services Digital Network), or FDDI (Fiber Distributed Data Interface), among others.

In one embodiment, IP telephone 120A may also be coupled to IP telephone 120B. The Service Gateway 170 may be coupled to a Media Gateway Controller (MGC) 150, as shown. In one embodiment, the IP telephones 120, the Service Gateway 170, and the Media Gateway Controller 150 may each include software and/or hardware which implements at least a portion of an embodiment of the present invention. For example, to address the "triangulation" problem described above, the SG 170 may include logic or software which is operable to discern an internal call from one which originates or terminates outside the company's network. Details of this process are described below with reference to FIGS. 3A-11.

In one embodiment, the system may implement a private IP backbone using registered IP addresses to provide a high availability/fault tolerant IP telephony network. The system may have a scalable design to facilitate rapid growth, and may implement capacity planning to reduce or avoid network congestion. Additionally, the system may have a flexible design to support future applications. For example, it is contemplated that in various embodiments, the system may provide support for substantially all access technologies. The system may further utilize traffic engineering to control data path, bandwidth allocation and latency/jitter, such as QoS (Quality of Service), MPLS (Multiple Protocol Label Switching), RSVP (Resource Reservation Protocol), etc., to provide an efficient, cost effective, high quality IP based telecommunication system.

It is further contemplated that in various embodiments, the system may be used to provide a national, or even international, IP telephony system. The system may partner with local Internet Service Providers (referred to herein as Channel Partners) in each Metropolitan Service Area (MSA) to provide connectivity between the customer and the system through a Point of Presence (PoP), i.e., a termination point for connections to each Channel Partner, and for connections to a local PSTN network.

For example, in one embodiment, the VoIP network components for each MSA may include the Point of Presence (PoP), a Core, or regional aggregation point, and an App, which may include various Soft Switch elements, SS7 gateways, Trunking Gateways, etc. In one embodiment, the App and the Core may be co-located. Further details of the network hardware components are presented below with reference to FIGS. 3A and 3B.

Figure 3A:
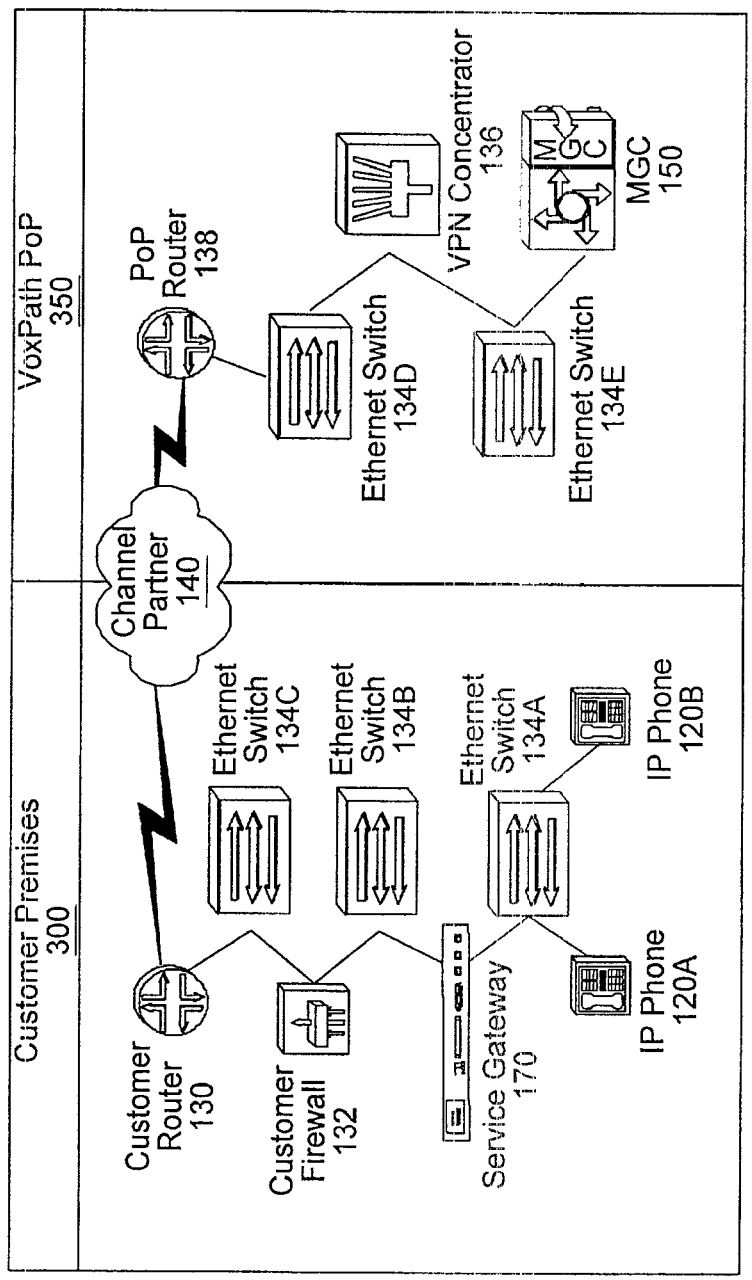
FIG. 3A is a basic Service Gateway/VPN diagram, according to one embodiment of the present invention.

FIG. 3A—Diagram of Basic Service Gateway and VPN

FIG. 3A is a diagram of one embodiment of the present system, including the Service Gateway 170 and a Virtual Private Network (VPN). As FIG. 3A shows, at least a portion of the system may be implemented on customer premises 300. Other aspects of the system may be implemented external to the customer premises 300, for example, in the system's PoP 350, as shown.

As indicated in FIG. 3A, components of the system present on the customer's premises 300 may include one or more IP telephones 120, such as IP telephones 120A and 120B. The IP telephones 120 may each be coupled to Service Gateway 170 through an Ethernet switch 134A. The Service Gateway may couple to a customer firewall 132 through a second Ethernet switch 134B, as shown. The customer firewall 132 may couple to a customer router 130 through a third Ethernet switch 134C.

In one embodiment, the customer router 130 may be operable to couple to Channel Partner 140, which may provide access to the off-premises components of the system, i.e., the VoIP PoP 350. As mentioned above, the Channel Partner 140 preferable includes an Internet Service Provider which is operable to provide network access, e.g., Internet access, to the customer. The PoP portion of the system may include a PoP router 138 which is operable to couple to the Channel Partner 140. The PoP router 138 may couple to a VPN Concentrator 136 through Ethernet switch 134D. (A concentrator is a type of multiplexor that combines multiple channels onto a single transmission medium in such a way that all the individual channels can be active simultaneously.) Finally, the VPN Concentrator may be coupled to the Media Gateway Controller 150 through Ethernet switch 134E. It should be noted that the configuration described is an exemplary embodiment, and that other configurations are contemplated. For example, in various embodiments, fewer or more Ethernet switches 134 than shown may be used to implement the system.

As mentioned above, the Service Gateway 170 may include logic and/or software which implements a portion of the system. It should be noted that the SG 170 differs substantially from ALG 70 (prior art). For example, instead of making the SG 170 aware of the higher-level protocols and performing complex decisions, the SG 170 may be used for a modified NAPT function in combination with Dynamic Host Controller Protocol (DHCP) and other services. Embodiments of each major function are detailed below:

Hardware Platform

In one embodiment, the SG 170 may be a small form factor device, or a rack mountable (19" rack) unit, with built-in AC power supply. The SG 170 may provide at least two 10 MBit Ethernet interfaces, preferably 10/100 MBit. The interfaces may support 802.q VLAN trunking. The unit may also have SNMP management, telnet access, minimum 2 Mbytes of flash memory, and a serial interface for command line access, as desired.

SG Addressing

The SG 170 may use a single, public IP address as the source and destination address for IPSec VPN tunnels. This address may be shared between the active and standby SGs 170. The SG 170 may use a single, public IP address to provide NAT support for all the internal hosts needing VoIP protocol support. It may be able to use additional NAT addresses to support a large number of internal hosts, e.g., IP telephones 120. This address may also be shared between the active and standby SGs 170. For the internal interfaces, the SG 170 must support virtual IP addresses for each VLAN interface.

Routing

As a gateway and VPN device, the SG 170 may support a variety of routing functions. Specifically, support for numerous static routes may be provided (e.g., at least 100). Additional routing protocol support is also contemplated (for example, OSPF and RIP version 2). The SG 170 may be the default gateway for all the IP telephones 120, therefore it may determine where traffic should be routed, and thus whether it should be NATed (or NAPPTed) and sent out a VPN interface, or routed to an internal physical interface (Ethernet) or logical interface (VLAN).

NAT/NAPT/NAPPT

Instead of dynamically assigning ports to IP telephones, the SG 170 may allocate a range of port numbers for each IP telephone 120 as it acquires its lease during a DHCP process, described below with reference to FIGS. 5A and 5B. The SG 170 may maintain a table of semi-permanent mappings of the external IP address and ports to the internal hosts and ports. The SG 170 may continue to replace the internal or private source IP address with the NATed external source IP address. It may not, however, modify the port information, though it may validate it to ensure the correct internal host is using its assigned port range. Such Network Address Translation may be referred to as Network Address Persistent Port Translation (NAPPT).

DHCP

In one embodiment, the SG 170 may provide support for DHCP. The SG 170 may be the DHCP server for those hosts to which it provides SG services. The SG 170 may support multiple scopes for multiple IP subnets (one subnet for each VLAN accessed via the 802.1q trunk). Specifically, via DHCP the SG 170 may perform one or more of the following: assign the IP address and network mask, set the SG 170 as the default gateway, set the DNS domain to the appropriate value, set the SG 170 as the TFTP/BOOTP server, provide the path and file name for the boot image, and set the host name.

In one embodiment, the SG 170 may also issue two as yet undefined DHCP options. As they are undefined, they may use the unassigned DHCP Option numbers (127-255). The SG 170 may assign a range of IP ports to each IP telephone for its own use, and provide the IP address of the soft switch. In one embodiment, the SG 170 may inform the IP telephones 120 which NAT address is being used by the SG 170 for their traffic.

In one embodiment, the DHCP service may also be able to perform MAC-based reservations. For example, it may ensure an IP address is not in use before assigning it (ping verification). As another example, it may be operable to assign addresses only to hosts with a particular client ID (to prevent other hosts from getting addresses). In one embodiment, the SG 170 may ignore DHCP lease requests coming from hosts not within a MAC range. To support redundancy, the DHCP lease information may be synchronized with the standby SG 170 to ensure the integrity of every registration in the event of active SG 170 failure.

Trivial File Transfer Protocol (TFTP)

In one embodiment, the SG 170 may also act as a file transfer server, e.g., a TFTP server. The IP telephones 120 may download software, e.g., initialization software, from the SG 170 when booting, thus, the SG 170 may include memory, e.g., at least 2 Megabytes of flash memory, for storing this initialization software. The flash on the active SG 170 may be automatically or manually copied to the flash of the standby SG 170.

Virtual Private Network (VPN)

For security of the Call Setup and the calls in progress, as well as to simplify the routing architecture, support for multiple IPSec (IP Security) VPN ESP (Encapsulating Security Payload) Tunnels may be provided, according to one embodiment. The external interface on the SG 170 may be one end of the tunnel, and the VPN Concentrator 136 may be the other end of the tunnel (located at the PoP servicing the customer's city). Furthermore, the ability to maintain a tunnel with a secondary VPN Concentrator 136 and other SGs 170 within the customer's private network may be provided. The external IP address used for the VPN tunnel may be different than the external IP address used for the NAT function. To simplify the routing architecture of the customer solution and the system network, the public IP addresses of the SGs 170 and the VPN Concentrator 136 that the customer uses may be from the same address block allocated to that customer's Internet Service Provider (ISP).

Firewall

Basic firewall functions may be provided as the SG 170 may be placed onto a public network, according to one embodiment. For performance reasons, one or more of stateful inspection, denial of service protection, intrusion detection and packet filtering may be performed at line speed.

Quality of Service (QoS)

In one embodiment, to ensure the a high level of performance within the network infrastructure of the customer's network and the customer's service provider, the SG 170 may maintain Type of Service (TOS) settings in any IP headers traversing the device, and may "mark" all IPSec traffic exiting the device with a TOS or Differentiated Services (DiffServ) setting, thereby helping to prioritize SG traffic over other traffic on the network.

Redundancy

Additionally, full redundancy for each function that the SG 170 performs may be provided, according to one embodiment. In the background, the primary SG 170 may maintain a connection state table for all NAT sessions, DHCP leases, and VPN tunnels. This function may be performed via a direct Ethernet connection, or over the internal network interfaces. The use of gratuitous ARP (Address Resolution Protocol) may be used on the local interfaces in the event of fail-over to keep its IP addresses reachable.

Additional Features

Some additional features that are also contemplated include: support for CRTP (Compressed Real Time Protocol), a 19" rack mountable form factor, a larger number of Ethernet interfaces, an integrated modem, RSVP support, and MPLS support, among others.

SG Features Summary

A summary of features of the Service Gateway 170 is presented below. It should be noted that the feature list is exemplary, and is not intended to limit the feature set of the Service Gateway 170. Rather, it is contemplated that in various embodiments, the flexibility of the system design may facilitate different or additional features to provide advanced and future IP based telecommunication services as the related technologies develop.

Service Gateway (SG) Features

Performance:
  Wire-rate performance, total latency through the unit less than 5 msIPSec Tunnels
  Support for 20+, wire-speed 3-DES IPSec tunnels
  Unique IP address for each tunnel
Firewall:
  Stateful inspection
  Source/destination IP address
  Source/destination port
  Denial of Service protection
IP Routing:
  Static routes (100+)
  OSPF
  IP v.2
  Routing across tunnels
High Availability:
  Optional
  Support for clustering or load balancing
  OR Support for an active/standby configuration
  Redundancy, extremely fast fail-over
  Connection State Transfer between HA peers for all features (NAPT, DHCP, etc.)
Interface Support:
  Support for 10 Mb Ethernet, 100 Mb Ethernet, full duplex
  Support for 802.1q and 802.1p for "outside" and "inside" interfaces
Port Translation:
  Virtual IP addresses
  Provide basic NAT translation (private to public IP) without changing port number
  Support multiple NAT addresses
  Perform NAT function before encrypting with IPSec and
  Forwarding NAT/NAPT "before" VPN
  Maintain persistent port mappings between internal hosts and assigned ports
DHCP Service:
  Standard features:
    Permanent lease with updates
    IP address
    Mask
    Default gateway
    Domain name
    Host name
    DNS server
    Validate address before assigning
    MAC based reservations
    Boot file name
    Boot file location
  Options:
    Assign port ranges for host, reserved in NAPT table
    Assign soft switch address
    DHCP table synchronization with standby device
  Additional DHCP Features:
  Support multiple scopes and super-scopes
  Support for MAC-based reservations
  Support leasing based on class identifier (ignore requests from non-phones)
  Issue leases based on client identifier (Ignore requests from non-phones)

Support standard DHCP options:
  Option 1 (Subnet Mask)
  Option 3 (Router Option)
  Option 4 (Time Server Option)
  Option 13 (Boot File Size Option)
  Option 17 (Root Path)
  Option 50 (Requested IP Address)
  Option 54 (Server Identifier)
  Option 66 (TFTP Server Name)
  Option 43 (Vendor Specific Information)
  Vendor Specific Options:
    Assign unique port ranges to DHCP clients
    Assign primary/backup MGC IP address
    Assign NAT address
Traffic Engineering:
QoS/ToS
Integrity of TOS bits in host traffic maintained
Setting of TOS bits for IPSec traffic
RSVP
MPLS
Rate Limiting/Queuing
TFTP Service:
Support TFTP service, TFTP server
Storage for many images (30-100 MB)
Support reading and writing from IP telephones
Support for error logging from IP telephones
Management:
Basic SNMP
Tunnel specific MIBs
Telnet
Serial interface
Other SG Features:
VPN (IPSec, 3DES, manual keys, hardware encryption/decryption, ESP tunnels)
Multiple simultaneous VPN tunnel terminations at wire speed (3+ tunnels)
CRTP support
BOOTP/TFTP
Minimum 2 MB free of flash
SNMP management
Telnet Access
Serial Interface
2×10/100 Mb Ethernet interfaces
Rack-mountable (19") preferable The VoIP IP Telephone In one embodiment, the internal hosts, or IP telephones, may use a private IP address assigned by the SG DHCP service in the normal fashion for all IP headers. Note that as used herein, the term "private IP address" refers to IP addresses in the ranges described in the Internet Engineering Task Force's (IETF) Request for Comment (RFC) 1918, as well as any IP addresses that have not been assigned by any Regional Internet Registry to the organization using the addresses. It should also be noted that as used herein, the term "public IP address" refers to any IP addresses assigned by any Regional Internet Registry to the organization using the addresses.

Each IP telephone 120 may use the port numbers assigned to it by the SG 170 as a part of the DHCP process. When requesting a DHCP lease, the IP telephone 120 may specify a client identifier to differentiate itself from other hosts on the network. The IP telephone 120 may also know the public IP address to which all its traffic is being NATed, so that the IP telephone 120 may inform the soft switch during the registration process, described below.

The Soft Switch

In one embodiment, the "soft switch" is actually a group of systems running many applications to perform a variety of functions. For example, the part of the soft switch that handles the interaction between the IP telephones 120 and the soft switch is referred to herein as the Media Gateway Controller (MGC) 150 (from the term used in the MEGACO standard for that interaction). The MGC 150, outside of its standard functions, may perform one or more special tasks in order to properly interoperate with the IP telephones 120 and SG 170. An example of such a special task is described for an embodiment which uses the MEGACO protocol: when an IP telephone 120 registers with the MGC 150, the MGC 150 may store the private address of the IP telephone 120 provided in the MEGACO header, as well as the NATed IP address used by the SG 170 in the IP header; or, the IP telephone 120 may pass that information along during registration. The MGC 150 may use this information to determine what IP address (public or private) needs to be conveyed to the call parties, and may be particularly useful in distinguishing between Call Setup requests for two IP telephones 120 on the same internal network, or for IP telephones on different networks. In the event that the IP telephones 120 are on the same customer premises 300, but operating through two different SGs 170, the RTP session may be directed to use public addresses.

VPN Concentrator

At the PoP, the VPN Concentrator may terminate the other end of the VPN tunnel initiated from the SG 170. This device may be operable to handle at least 1000 IPSec, 3DES, ESP tunnels at wire speed, and may also support basic routing and firewall functions like the SG 170, as well as 802.1q/p. The VPN Concentrator 136 may also provide a highly available solution where failure of an active device does not result in the tear-down of all existing tunnels. In the event this is not technically feasible, then each SG 170 may maintain two active VPN tunnels at all times.

Basic VPN Concentrator Feature Summary

A summary of features of the VPN Concentrator 136 is presented below. It should be noted that the feature list is exemplary, and is not intended to limit the contemplated feature set of the VPN Concentrator 136. Rather, it is contemplated that the flexibility of the system design may facilitate additional features to provide advanced and future IP based telecommunication services as the related technologies develop.

VPN Concentrator Features:
  Firewall
  Source/destination IP address
  Source/destination port
  Denial of Service protection
  IP Routing
  Static routes (1000+)
  OSPF
  Routing across tunnels
  High Availability
  Support for clustering or load balancing
  OR Support for an active/standby configuration
  Redundancy, extremely fast fail-over
  Connection State Transfer between HA peers
  Interface Support
  Support for 100 Mb Ethernet, Gigabit Ethernet, full duplex
  Support for 802.1q and 802.1p for "outside" and "inside" interfaces
  Traffic Engineering
  QoS/ToS
  RSVP
  MPLS
  Rate Limiting/Queuing IPSec Tunnels
Support for 1000+, wire-speed 3-DES IPSec tunnels
Unique IP address for each tunnel
Other Features:
CRTP support
Multiple simultaneous VPN tunnel terminations at wire speed (1000 tunnels+)
Multiple VPN destination addresses
VPN Concentrator management features:
Basic SNMP
Tunnel specific MIBs
Telnet
Serial interface
Centralized management
Centralized provisioning
Global key management Customer Firewall In one embodiment, for security purposes, a customer firewall 132 may reside on the customer premises, separating the customer's internal network from external systems. The firewall 132 at the customer premises may be operable to support certain features in order to work in conjunction with the SG 170. If the firewall 132 does not support these features, then the SG 170 may be deployed in parallel with the firewall 132, rather than behind it.

Because the SG 170 may be participating in an IPSec session, it may source its IP packets with a public IP address and have its IP packets remain unmodified as they pass through the firewall 132. This includes no changes to the IP header in any way, as any changes to the header may cause the IPSec traffic to be discarded by the VPN device at the other end.

The features described above for each device in the system may provide an efficient and flexible solution for VoIP telephony. Furthermore, various embodiments of the system may include an architecture that provides solutions for a number of problems related to the implementation of the system in the customer environment.

The issue of unattainable addresses may be addressed by using a NAPT technology, as is well known in the art. Using a small number of routable addresses for each SG 170 is a reasonable and justifiable approach which is consonant with the goals and methods of ARIN (American Registry for Internet Numbers). The use of VPN technologies and the use of the SG 170 as the default gateway for all the IP telephones 120 may simplify the routing architecture of the VoIP solution. The problem of supporting application layer protocols that use UDP, multiple and sequential port numbers, and sessions initiated from outside the network may be addressed by the SG 170. The perpetual NAPT table maintained by the SG 170 may solve the traditional problem of dynamic port numbers. The "triangulation" problem mentioned above may be solved by the intelligence in the soft switch, in combination with port range allocation and the NAPPT process. By implementing a DHCP solution dedicated to the VoIP network, the customer's and service providers network DHCP resources (which may be of questionable reliability) may not be needed.

A number of specific problems related to VoIP telephony are described below, as well as possible corresponding solutions provided by various embodiments of the present invention. It should be noted that various embodiments of the present invention may each address none, a portion of, or all of the problems listed below.

Routing Problems

Problem: it is desired that application traffic leaving the customer premise take a predictable path, preferably the shortest path across the Channel Partner's network, with low latency and jitter. This may be a challenge because:

1) QoS technologies vary greatly in different service provider networks;
2) Channel Partners (ISPs) typically will not accept hundreds of small route advertisements needed to advertise (/32, /30, /29, etc.);
3) The system cannot act as a transit connection between various service providers;
4) Therefore the system cannot run BGP with the Channel Partners.

Routing Solutions

1) Acquire small public IP block from each channel partner for addressing interfaces for PoP routers;
2) Place Service Gateway at customer premise for use as default gateway for IP telephones;
3) Utilize VPN technology to tunnel MEGACO and RTP traffic across customer/channel partner networks;
4) Use Channel Partner IP addresses on the VPN Concentrator to ensure traffic stays on Channel Partner network;
5) Negotiate service guarantees for VPN traffic (source/destination address) from Channel Partners via appropriate traffic engineering technology for their network.

Firewall Problems

Current firewall products do not support the protocols employed by the system, i.e. MEGACO, RTP, RTCP The basic issues are:
1) NAPT is necessary for IP address conservation (ARIN won't provide registered IP address for IP telephones);
2) The IP/port information is in the payload;
3) These protocols use multiple UDP ports;
4) Firewalls do not support UDP sessions well;
5) UDP sessions are initiated from the outside/untrusted network;
6) IP telephones register their IP and port numbers, expecting them to be persistent;
7) NAPT performs dynamic allocation of ports.

Firewall Solutions

1) Bypass customer router entirely; or
2) Tunnel VPN traffic through customer firewall; this provides small "hole" in the firewall (TCP session, limited source/destination pairs), and hides all un-supported protocols from the firewall;
3) Perform NAPT function prior to encryption, so the firewall is simply routing the traffic through.

Figure 3B:
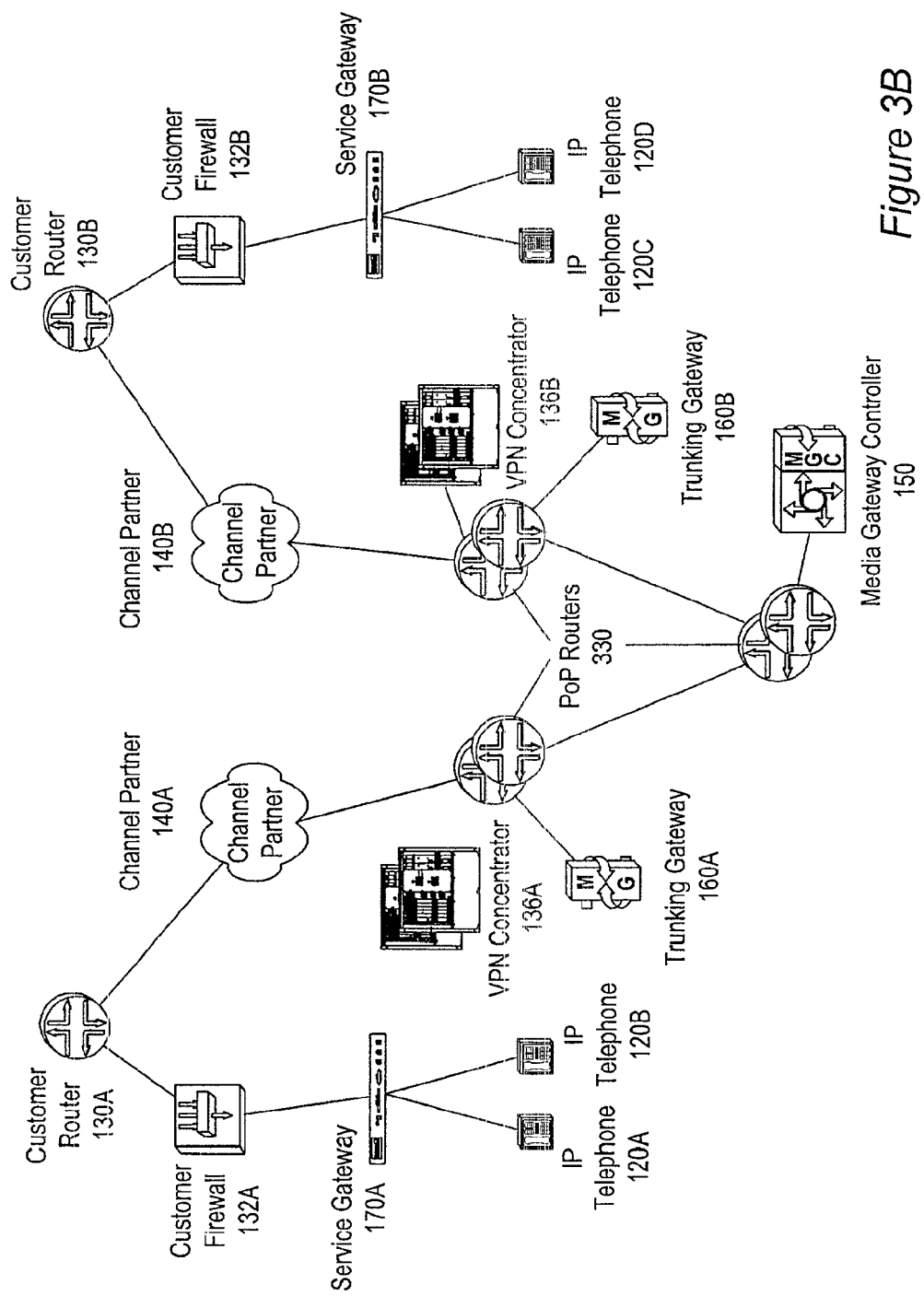
FIG. 3B is a diagram of an IP telephony network, according to one embodiment of the present invention.

FIG. 3B—Diagram of IP Telephone to IP Telephone Network

FIG. 3B is a diagram of a VoIP network providing for communication between IP telephones 120 of two different LANs, i.e., between IP telephones on different customer premises. The system illustrated in FIG. 3B is effectively a bilateral implementation of the system described above with reference to FIG. 3A.

As FIG. 3B shows, IP telephones 120A and 120B may be coupled to SG 170A, which may in turn be coupled to customer firewall 132A. The customer firewall 132A may be coupled to customer router 130A through which access to Channel Partner (ISP) 170A may be provided. Thus, for a customer A, the on-site components of the VoIP system may include the IP telephones 120, the SG 170A, the firewall 130A, and the router 130A, as well as other support equipment, such as one or more Ethernet switches (not shown), etc.

In one embodiment, a corresponding set of components may be present on a customer B's premises, as shown. Specifically, IP telephones 120C and 120D, SG 170B, firewall 130B, and router 130B, coupled together as described above, wherein the customer router 130B may be coupled to Channel Partner (ISP) 140B.

Each customer's Channel Partner may be coupled to respective PoP routers 330, which may provide access to the system PoP components. More specifically, the PoP router 330 coupled to Channel Partner 140A may couple to VPN Concentrator 136A and Trunking Gateway 160A. The PoP router 330 may further couple to Media Gate Controller 150 via another PoP router 330, thereby communicatively coupling IP telephones 120A and 120B to the system PoP components for customer A. Similarly, the PoP router 330 coupled to Channel Partner 140B may couple to VPN Concentrator 136B and Trunking Gateway 160B. The PoP router 330 may further couple to Media Gate Controller 150 via the PoP router 330, thereby communicatively coupling IP telephones 120C and 120D to the system PoP components for customer B.

Figure 4A:
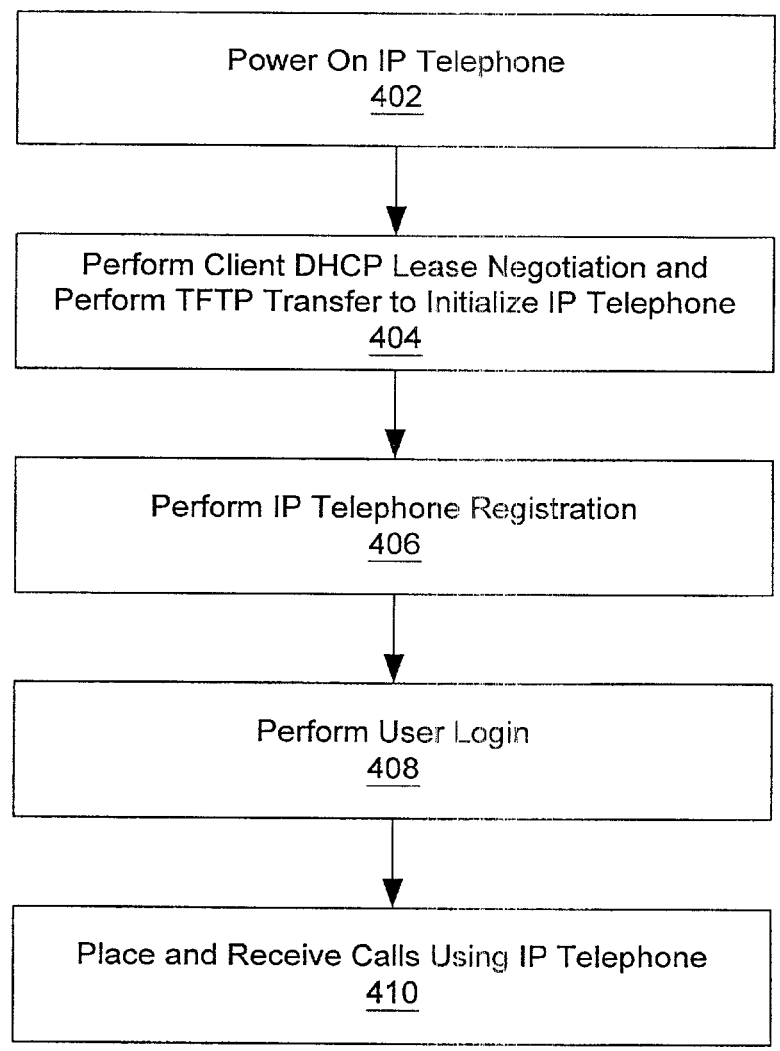
FIGS. 4A and 4B flowchart IP telephone initialization, configuration, and use, according to one embodiment.
Figure 4B:
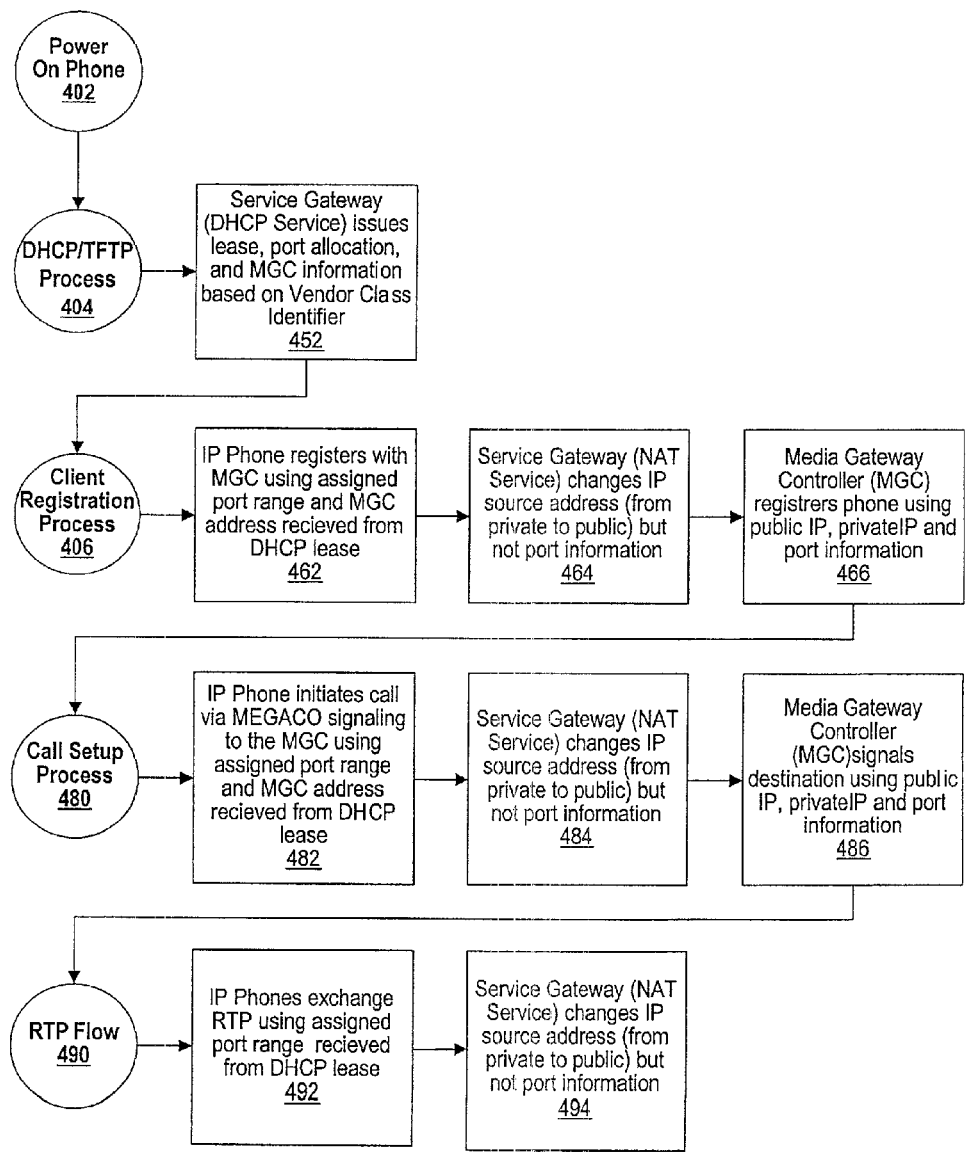

FIGS. 4A and 4B—IP Telephone Initialization Configuration and Use

FIGS. 4A and 4B are flowchart diagrams that illustrate initialization, configuration, and use of an IP telephone 120 (or other Media Gateway) according to one embodiment of the present invention. It is noted that FIGS. 4A and 4B illustrate one embodiment, and that configuration and operation of the IP telephone 120 may be performed using various other methods according to the invention as desired. It is further noted that various of the steps shown may be performed in different orders or omitted, or various additional steps may be performed as desired.

FIG. 4A flowcharts a high level IP telephony process. As shown, in step 402 the IP telephone 120 may be powered on, i.e., activated. Step 402 may occur when the IP telephone 120 is initially installed at the client location, i.e., when it is first installed and powered on. Alternately, step 402 may be performed periodically, i.e., each morning when the user powers on the IP telephone 120. In one embodiment, the activation of the IP telephone may be performed programmatically by software executing on the IP telephone, an external system coupled to the IP telephone, or both.

In step 404 client DHCP lease negotiations may be performed. According to one embodiment, in step 404 the IP telephone 120 may contact the Service Gateway 170 requesting a DHCP assigned IP address. In response, the client DHCP lease negotiations may be performed in step 404, where, as part of the DHCP lease negotiations, the Service Gateway 170 may perform a TFTP transfer to the IP telephone 120 to initialize the IP telephone 120. This may involve transferring boot and/or configuration data to a memory, e.g., an EEPROM, located on the IP telephone 120 to configure or boot the IP telephone 120. In one embodiment, the TFTP process may include first booting the IP telephone, then loading an application which is executable to perform IP telephony. The client DHCP lease negotiations performed in step 404 are described in detail in the flowchart of FIGS. 5A and 5B.

In step 406 the Media Gateway Controller (MGC) 150 and the IP telephone 120 may perform IP telephone 120 registration. This may involve registering the IP telephone 120 with the MGC 150, and may include transmitting registration information between the MGC 150 and the IP telephone 120. One embodiment of the IP telephone registration process utilizing the MEGACO standard is described in more detail below with respect to the flowchart of FIGS. 6A, 6B, and 6C.

In step 408 the user may login to the IP telephone 120. It is noted that user login may be optional, and further that the user login may actually be performed prior to the IP telephone registration in step 408. After the user has logged in and provided any necessary password, then the IP telephone 120 may be ready for operation or use. Thus, in step 410 the user may place and receive calls using the IP telephone 120, where the system, e.g., the SG 170, may mediate IP communications between the IP telephone and an IP device, and where the IP telephone uses at least a subset of the range of port numbers to send or receive the IP communications.

FIG. 4B flowcharts one embodiment of the process described above with reference to FIG. 4A in greater detail. As FIG. 4B shows, in 402, as described above, the IP telephone may be powered on, then in 404 the DHCP/TFTP process may be performed. In one embodiment, the system, e.g., the Service Gateway 170, may receive an identifier from the IP telephone 120. In one embodiment, the identifier may include a Vendor Class ID. The SG 170 may then determine if the identifier is valid, and if the identifier is valid, assign a range of port numbers to the IP telephone 120 based on the identifier. The IP telephone 120 may then use at least a subset of the range of port numbers to send or receive IP communications. In one embodiment, the system may also receive a MAC ID for the IP telephone, and if the system determines that the MAC ID is valid, the system may then determine if the IP telephone identifier is valid. In 452, more details of the DHCP/TFTP process 404 are shown.

As indicated in 452, in one embodiment, the system may provide DHCP lease information, port range allocation, and Media Gateway Controller (MGC) information, e.g., an MGC address, to the IP telephone 120 based on the identifier, e.g., the Vendor Class ID.

In one embodiment, the identifier of the IP telephone 120 may be included in a DHCP discover message issued by the IP telephone 120 to the SG 170, in which case the SG 170 may respond with a DHCP offer to the IP telephone (if the identifier is determined to be valid), where the DHCP offer may include DHCP lease information based on the validated identifier. The IP telephone 120 may then issue a DHCP request in response to the issued DHCP offer. The SG 170 and the IP telephone 120 may each then store the DHCP lease information, and the IP telephone 120 may enable DHCP settings included in the DHCP lease information. In one embodiment, the DHCP lease information may include the range of port numbers, as well as information indicating operational software for the IP telephone 120. The IP telephone 120 may then execute the indicated operational software to enable the IP communications. In another embodiment, the IP telephone 120 may issue a request for the indicated operational software, for example, by issuing a read request to a file transfer server, such as a Trivial File Transfer Protocol (TFTP) server. The file transfer server may provide the operational software to the IP telephone 120 in response to the request, and the IP telephone 120 may then execute the operational software to enable the IP communications.

It should be noted that the port allocation preferably includes assigning a range of ports to the IP telephone 120 rather than a single port, with the port range depending upon the identifier of the IP telephone 120, e.g., the Vendor Class ID. For example, an IP telephone 120 capable of using multiple telephone lines may be assigned a greater range of ports than a single line IP telephone. In one embodiment, two ports may be assigned for each two-way communication channel— one port for incoming information, and one for outgoing information. Additional ports may be assigned for other services, such as paging, etc., such that a wide variety of digital telecommunication services may be provided over the same infrastructure, including future digital telecommunication services not currently defined or in use. In one embodiment, the range of port numbers assigned to the IP telephone 120 may include ports which are not reserved for use by other IP protocols, such as FTP, HTTP, etc., by the Internet Engineering Task Force (IETF).

As described above with reference to FIG. 4A 404, the method may further include downloading initialization information to the IP telephone 120 via TFTP.

In 406, client registration may be performed, as explained in greater detail in 462-466. In 462, the IP telephone 120 may register with the MGC 150 using the assigned port range received from the DHCP lease of 404 above. Note that the IP telephone 120 may contact the MGC 150 using the MGC information (e.g., an address of the MGC 150) provided in 452 above. Then, in 464 the Service Gateway 170 (as a NAT service) may change the IP source address, e.g., from private to public, but leave the port information unmodified. In 466, the MGC 150 may register the IP telephone 120 using public IP and port information of the IP telephone, i.e., registration information of the IP telephone. In one embodiment, the registration information may also include private IP information of the IP telephone. In other words, the MGC 150 may also use private IP information (e.g., the private IP address) of the IP telephone to register the IP telephone. It should be noted that in one embodiment, the MGC 150 may store the received registration information for use in Call Setup, described below.

It should be noted that in one embodiment the process described in 480-494 below substantially describes the process described in 408 and 410 of FIG. 4A, wherein a user optionally logs in to the system, then places or receives telephone calls. In 480, a Call Setup process may be performed. In particular, in 482 the IP telephone 120 may initiate a call via MEGACO signaling to the MGC 150 using the assigned port range and MGC address received from the DHCP lease in 404 above. In 484 the Service Gateway 170 (as a NAT service) may change the IP source address, e.g., from private to public, but leave the port information unmodified. Then, in 486 the MGC 150 may signal the call destination, e.g., an IP device, using public IP, private IP, and/or port information.

In 490, RTP flow related to the IP telephone call may be managed. For example, as indicated in 492, in one embodiment, the IP telephones may exchange RTP using one or more ports from the assigned port range received from the DHCP lease of 404 above. Then, as described above in 464 and 484, in 494, the Service Gateway 170 (as a NAT service) may change the IP source address, e.g., from private to public, leaving the port information unmodified. More specifically, the SG 170 may receive a data packet from the IP telephone 120, perform a network address persistent port translation (NAPPT) on the data packet, and send the NAPPTed data packet to a destination IP device. As mentioned above, the data packet may include a private source IP address of the IP telephone 120, a source port number (from the IP telephone's assigned range of port numbers), and destination information associated with the IP device. In one embodiment, performing a NAPPT on the data packet may include changing the private source IP address to a public source IP address while leaving the source port number unchanged, and where the public source IP address and the source port number may be used to uniquely identify the IP telephone 120.

Conversely, when the SG 170 receives a data packet from the IP device destined for the IP telephone 120, the data packet may include a public destination IP address, a destination port number; and source information associated with the IP device, where the destination port number is in the assigned range of port numbers for the IP telephone 120. In one embodiment, the public destination IP address and the destination port number may be used to uniquely identify the IP telephone 120. Performing a NAPPT on the data packet may include using the public destination IP address and the destination port number to uniquely identify the IP telephone 120, and changing the public destination IP address to a private destination IP address while leaving the destination port number unchanged. Note that in this embodiment, the private IP address may be an IP address of the IP telephone 120. After NAPPTing the data packet, the SG 170 may send the data packet to the IP telephone 120.

Thus, in the above process, the SG 170 may facilitate and mediate the IP telephony process by assigning a range of ports to a client IP telephone, and by NAPPTing packet IP source/destination addresses while leaving the corresponding port information unchanged. These features may allow for a great deal of flexibility and future expansion of the system, while addressing the "triangle" problem of distinguishing between internal and external IP telephone connections.

Each of these sub-processes is described in greater detail below with reference to FIG. 5A-10B.

Figure 5A:
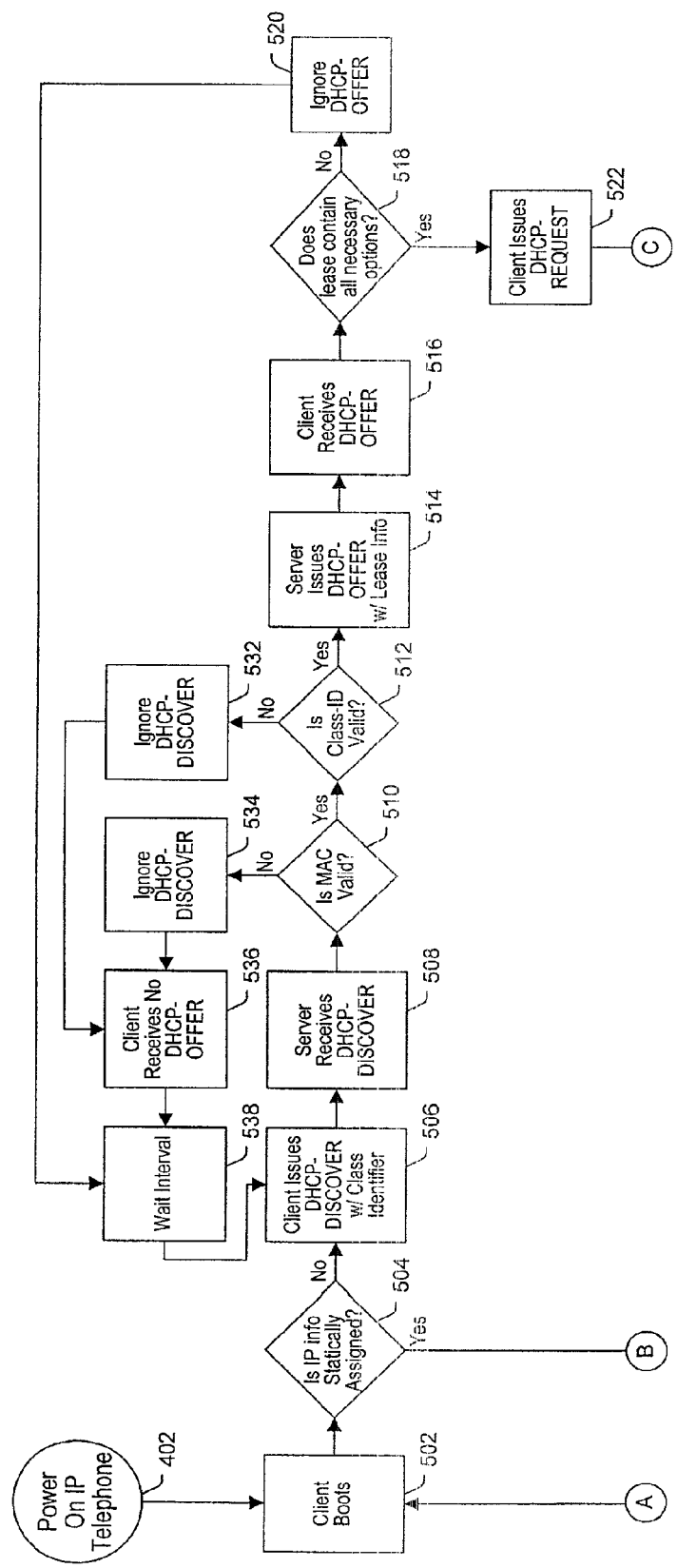
FIGS. 5A and 5B flowchart a client DHCP lease negotiation process, according to one embodiment.
Figure 5B:
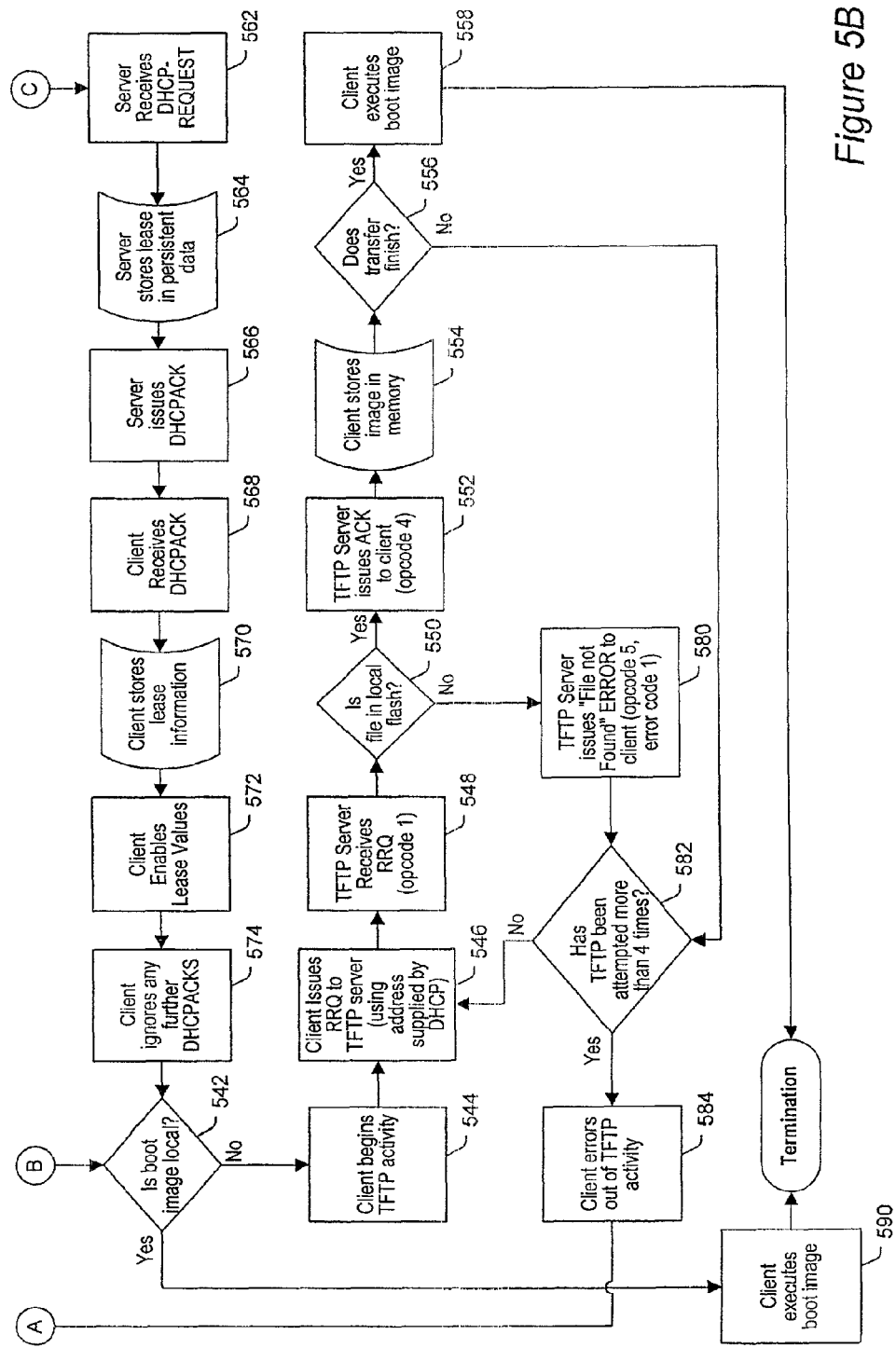

FIGS. 5A and 5B—Client DHCP Lease Negotiations

FIGS. 5A and 5B illustrates one embodiment of client DHCP lease negotiations performed in 404 above, according to one embodiment of the invention. It is noted that FIGS. 5A and 5B illustrate one exemplary embodiment of these lease negotiations, and that these negotiations may be performed in various manners according to the present invention. It is further noted that various of the steps shown may be performed in different orders or omitted, or various additional steps may be performed as desired.

As shown, in step 502 the client IP telephone 120 may begin execution of a boot application. This may involve beginning execution of an application stored on a memory on the IP telephone 120 such as an EEPROM.

In step 504 the IP telephone 120 may determine if an IP address or IP information has been statically assigned. If IP information has been statically assigned as determined in step 504, then operation may proceed to step 542, described below. If IP information is determined to not be statically assigned in step 504, then in step 506 the client IP telephone 120 may issue a DHCP discover command, including a class identifier, e.g., a Vendor Class Identifier. This DHCP discover request operates to request a DHCP dynamically assigned IP address.

In step 508 the server, e.g., the Service Gateway 170, may receive the DHCP discover command. In step 510 the Service Gateway 170 may determine if the Mac ID of the IP telephone 120 is valid. If not, then operation may proceed to step 534, described below. If the Mac ID is determined to be valid in step 510 then in step 512 the Service Gateway 170 may determine if the identifier, e.g., the Vendor Class ID, is valid. If the Vendor Class ID is not valid then operation may proceed to step 532, described below.

If the Vendor Class ID is determined to be valid in step 512, then in step 514 the server, i.e., the Service Gateway 170 may issue a DHCP offer with lease information. In step 516 the client may receive the DHCP offer. As described above, in one embodiment, the DHCP offer may include DHCP lease information for the IP telephone 120.

In step 518 the IP telephone 120 may determine whether the lease contains all the necessary options for operation of the IP telephone 120. If the lease is determined to not contain all the necessary options as determined in step 518, then in step 520 the IP telephone 120 may ignore the DHCP offer and operation may proceed to step 538.

In step 538 the IP telephone 120 may wait for a period of time, e.g., a wait interval, and then reissue a DHCP discover command with Vendor Class ID in step 506, and the above operation may repeat.

If the MAC ID is determined to not be valid in step 510, then in step 534 the Service Gateway 170 may ignore the DHCP discover command, i.e., no DHCP offer may be provided, and in 536 the client may not receive any DHCP offer.

If the Vendor Class ID is determined to not be valid in step 512, then in step 532 the Service Gateway 170 may ignore the DHCP discover command and in step 536 the client accordingly may not receive any DHCP offer. In either instance after any of steps 532 or 536, if the IP telephone 120 does not receive a DHCP offer after a certain period of time, i.e., after the wait interval in step 538, then in step 506 the client may reissue a DHCP discover command with the Vendor Class ID, and the above operation may repeat.

If in step 518 the IP telephone 120 determines that the lease does contain all the necessary options, then in step 522 the client may issue a DHCP request. After issuing the DHCP request in step 522, the operation may proceed to step 562 of the flowchart, described below.

If in step 504 the client IP telephone 120 determines that the IP information is statically assigned, then operation may proceed to step 542. As shown, in step 542 the client IP telephone 120 may determine whether the boot image is local, i.e., if the operational software for the IP telephone is stored locally. If the boot image is determined to be local in step 542, then in step 590 the client may execute the boot image to boot up the IP telephone, and then termination may occur wherein the operation completes.

If the boot image is determined to not be local in step 542, then in step 544 the client may begin Trivial File Transfer Protocol (TFTP) activity. In step 546 the client may issue a RRQ (e.g., a read request) to a TFTP server preferably using the address supplied by the DHCP. In step 548 the TFTP server may receive the RRQ (opcode 1). In step 550 the TFTP server may determine if the file is in the local flash. If so, then in step 552 the TFTP server may issue an acknowledge to the client IP telephone 120 (opcode 4) and in step 554 the client IP telephone 120 may store the image in memory. In other words, in step 554 the TFTP server may transfer the image to the client IP telephone, and the client IP telephone 120 may store this image in the memory.

In step 556 the client IP telephone 120 may determine whether the transfer has finished or completed. If so, then the client IP telephone 120 may execute the boot image received and stored in step 554, and operation may terminate or complete.

If the IP telephone 120 determines that the transfer has not completed in step 556, then operation may proceed to step 582. In step 582 if the TFTP has been attempted more than some other specified threshold (e.g., four times), then the client IP telephone 120 may error out of TFTP activity in step 584 and operation may proceed to step 502. If TFTP transfer has not been attempted more than four times, then operation may proceed to step 546, and the above operations may repeat.

If the TFTP server determines that the file is not in the local flash in step 550, then in step 580 the TFTP server may issue a file not found error to the client IP telephone 120 (output 5 error code 1) and operation may proceed to step 582.

After the client issues the DHCP request in step 522, then operation may proceed to step 562 as noted above. In step 562 the server may receive the DHCP request. In step 564 the server may store the lease in persistent data, i.e., store the lease in a nonvolatile memory on the server. In step 566 the server may issue a DHCP acknowledge (DHCP ACK). In step 568 the client may receive the DHCP acknowledge. In step 570 the client may store the lease information received from the server. In step 572 the client may enable the lease values (i.e., DHCP settings) received. In step 574 the client may ignore any further DHCP acknowledges and operation may proceed to step 542. The lease information in step 570 may include a private IP address and other lease information which enables operation of the IP telephone 120 on the local network of the client system.

Thus, in the DHCP lease negotiation and registration, the IP telephone may be assigned a range of ports for use, depending upon the IP telephone's Vendor Class ID. For example, an IP telephone capable of using multiple telephone lines may be assigned a greater range of ports than a single line IP telephone. In the preferred embodiment, two ports are assigned for each two-way communication channel—one port for incoming information, and one for outgoing information. Additional ports may be assigned for other services, such as paging, etc., such that a wide variety of digital telecommunication services may be provided over the same infrastructure. The system may distinguish between internal call connections and external call connections by examining the information associated with the IP telephone(s) involved with the call.

Figure 6A:
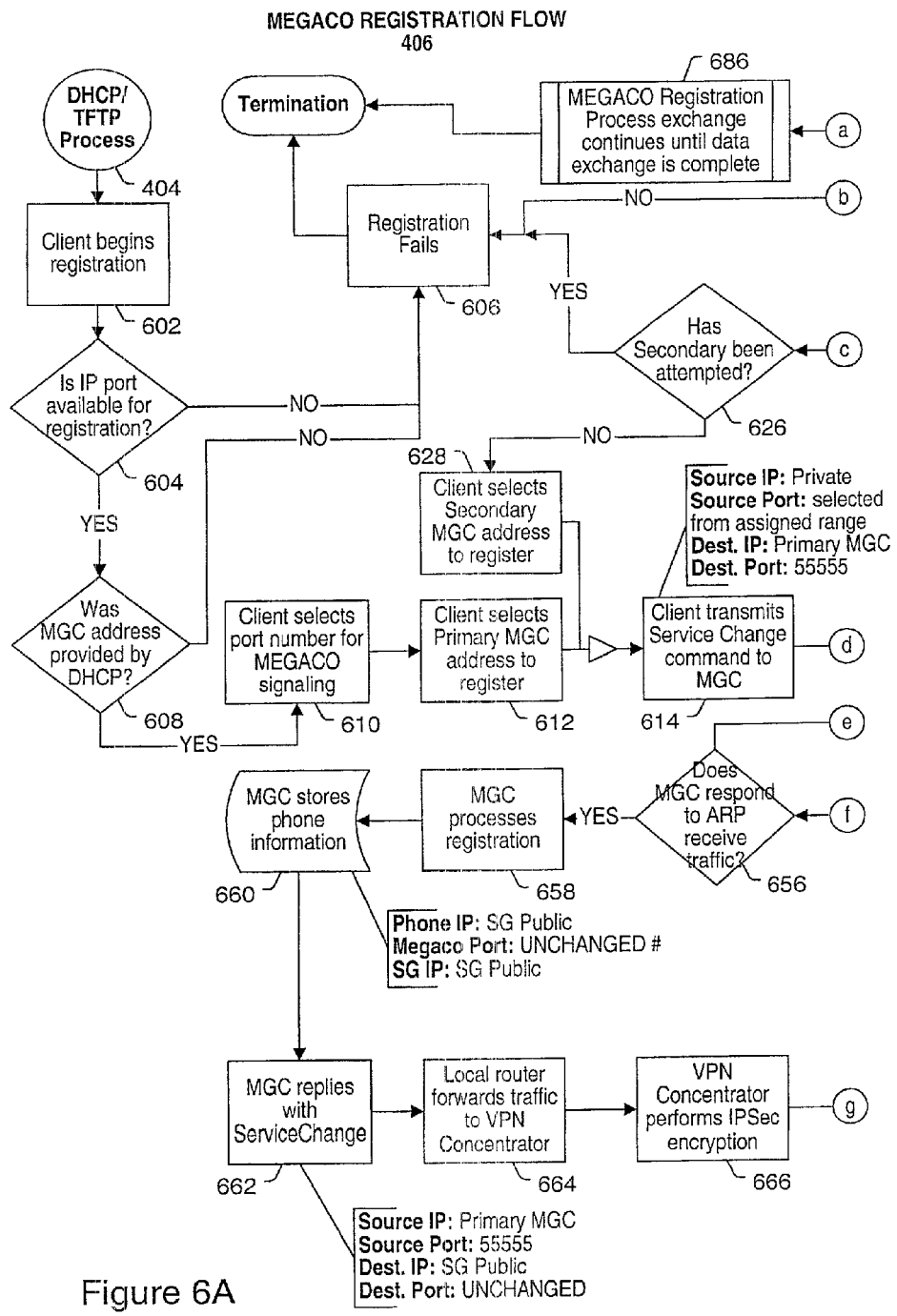
FIGS. 6A, 6B and 6C flowchart an IP telephone registration process, according to one embodiment of the invention.
Figure 6B:
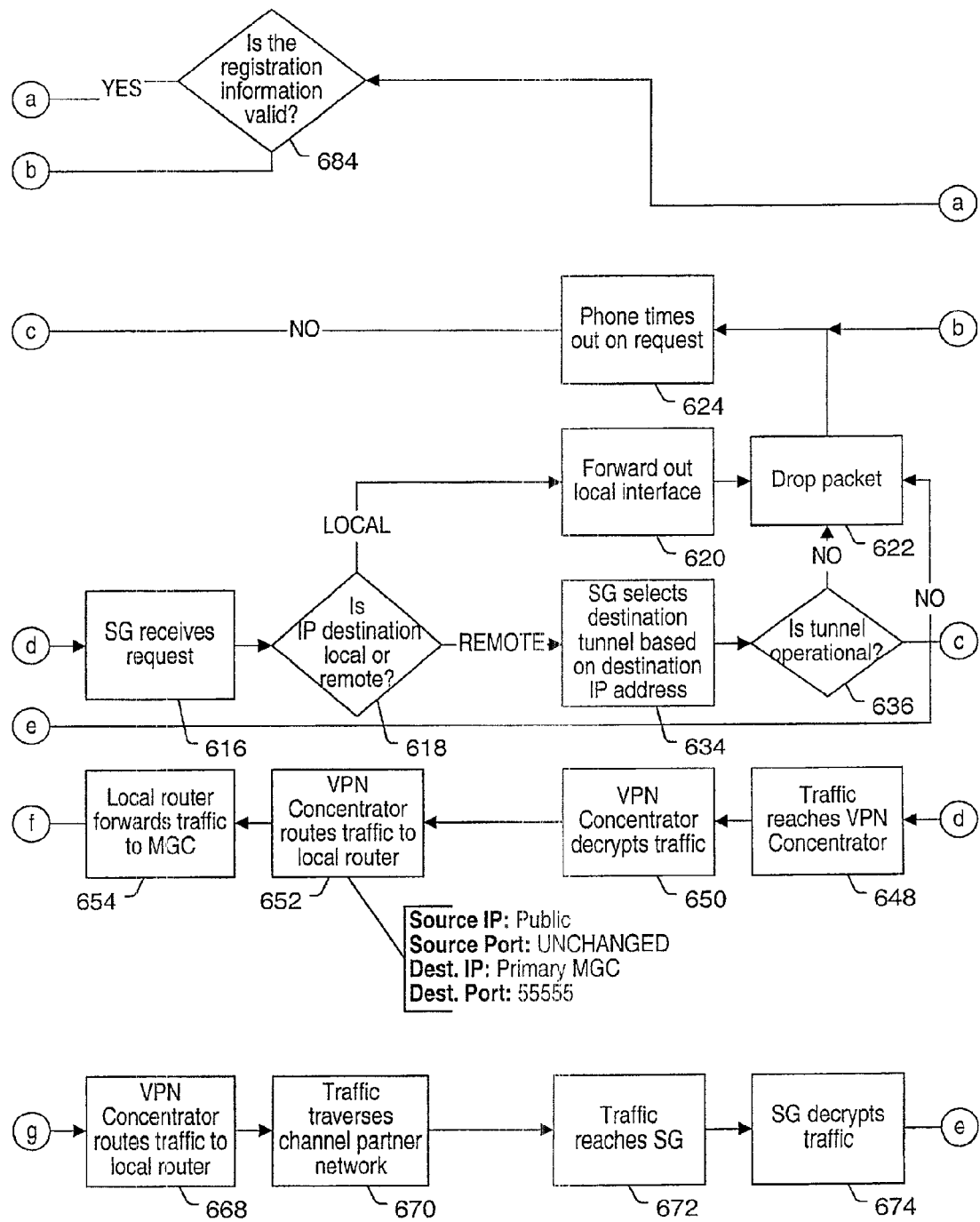
Figure 6C:
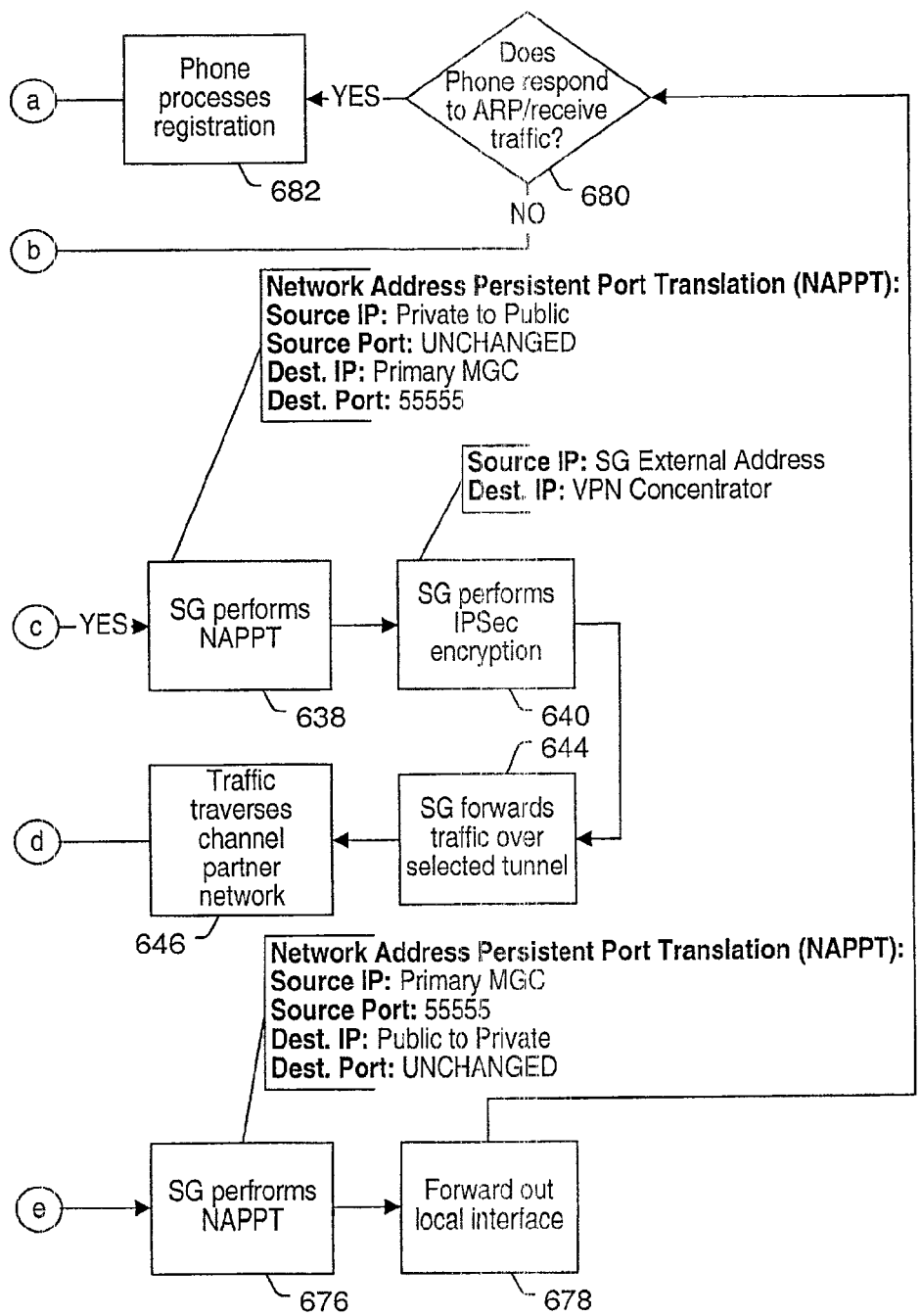

FIGS. 6A, 6B and 6C—IP Telephone Registration Process

FIGS. 6A, 6B and 6C flowchart the IP telephone registration process of 406 described with reference to FIGS. 4A and 4B above, according to one embodiment. This particular embodiment uses the MEGACO standard, although other protocols and standards may be implemented as desired. It is further noted that various of the steps shown may be performed in different orders or omitted, or various additional steps may be performed as desired.

As shown, after the DHCP/TFPP process 404 is completed, then in step 602 the client may begin the registration process.

In step 604 the system may determine if an IP port is available for registration. If an IP port is not available for registration then in step 606 the registration may fail and the process may terminate.

If an IP port is available for registration then in step 608 the system may determine if the Media Gateway Controller address is provided by DHCP. If the MGC address was not provided by DHCP then again in step 606 the registration may fail and the process may terminate.

If the MGC address was provided by DHCP then in step 610 the client may select a port number for MEGACO. Then in step 612 the client may select a primary MGC address to register.

In step 614 the client may transmit a Service Change command to the MGC 150. An example packet header is shown as part of 614, comprising a source IP address, denoted as Private, a source port, selected from the assigned port range as indicated, a destination IP address, here shown as the Primary MGC address, and a destination port, here shown with an arbitrary example value of 55555. In step 616 the Service Gateway (SG) 170 may receive the request. Then in step 618 the system, e.g., the SG, may determine if the IP destination is internal or external, i.e., remote.

If the IP destination is determined to be internal then in step 620 the data (packet) may be forwarded out the local interface, and in step 622 the packet may be dropped.

In step 624 the telephone may time out on the request. Then in step 626 the system may determine if use of a secondary MGC address has been attempted, and if a secondary has been attempted then in step 606 the registration may fail and the process may terminate. If a secondary has not been attempted then in step 628 the client may select a secondary MGC address to register and the process may continue again at step 614 as described above.

Referring back to step 618, if the IP destination is determined to be external, then in step 634 the Service Gateway 170 may select a destination tunnel based on the destination IP address. Then in step 636 the system may determine if the selected tunnel is operational. If the tunnel is not operational then in step 622 the packet may be dropped and the process may continue with step 624 as previously described.

If the tunnel is operational then in step 638 the Service Gateway 170 may perform Network Address Persistent Port Translation or NAPPT. As indicated, the packet header information at this stage may change in the following way: the source IP address may be changed from Private to Public, while the source port remains UNCHANGED; the destination IP address remains set to the primary MGC address; and the destination port retains the example value 55555.

Then in step 640 the Service Gateway 170 may perform IP security encryption on the packet. As shown, the original packet is encapsulated in a new packet with a source address of the external interface address of the Service Gateway, and the destination address of the VPN Concentrator. The Service Gateway 170 may forward the data (packet) over the selected tunnel.

In step 646 the traffic may traverse the channel partner network, i.e., the network provided by an Internet Service Provider (ISP). After the data traffic (packet) has traversed the channel partner network then in step 648 the data traffic may reach a virtual private network concentrator or VPN Concentrator 136.

In step 650, the VPN Concentrator 136 may decrypt the data traffic, and, as shown in step 652, may route the data traffic to a local router. As shown, in one embodiment, the data packet header information at this point may include a source IP address, indicated as Public, a source port which remains UNCHANGED, as shown, a destination IP address set to the primary address of the MGC, and a destination port with the example value of 55555.

In step 654 the local router may forward the data traffic to the MGC 150, then, in step 656 the system may determine if the MGC 150 receives the data, i.e., responds to Address Resolution Protocol (ARP). If the MGC 150 does not receive the data then the process may drop the packet in step 622, and continue as described above.

If the MGC 150 does receive the packet, i.e., does respond to the ARP, then in step 658 the MGC 150 may process the registration. In step 660 the MGC 150 may store the information in response to the registration. One example of the stored information is shown as part of 660, comprising the IP telephone IP address, denoted as SG Public, referring to the Service Gateway's public IP address for the telephone 120, the MEGACO port, indicated here as UNCHANGED, and the SG IP, indicated as SG Public.

In step 662 the MGC 150 may reply with a Service Change. This may involve sending a packet back to the source IP telephone, and so, as 662 shows, in one embodiment, the packet header for the data now may now include the source IP address and port set to the Primary MGC address and the example value 55555, i.e., the prior packet's destination information described in 614 above. As indicated, the destination information may include the destination IP address set to the SG public address, and the destination port remaining UNCHANGED. In step 664 a local router may forward the traffic to the VPN Concentrator 136. In step 666 the VPN Concentrator 136 may perform IP security encryption. In step 668 the VPN Concentrator 136 may route the data to another local router. Then in step 670 the data may traverse the channel partner network, i.e., the network provided by the ISP.

In step 672 the data may reach the Service Gateway 170. The Service Gateway 170 may then decrypt the data as indicated in step 674. In step 676 the Service Gateway 170 may then perform Network Address Persistent Port Translation (NAPPT). As step 676 shows, the packet header information may be modified such that the source IP address is set to the primary MGC address, the source port is set to the example value 55555, the destination IP address is changed from Public to Private, and the destination port remains UNCHANGED. Then in step 678 the SG may forward the data out through the local interface.

In step 680 the system may determine of the telephone responds to the address resolution protocol, i.e., may determine if the telephone receives the data. If the telephone does not receive the data, then the process may proceed with step 624, described above. If the telephone does receive the data, then in step 682 the telephone 120 may process the registration.

In step 684 the system may determine if the registration information is valid. If the registration information is invalid, then the registration may fail, as indicated in 606, and the process may terminate.

If the registration information is valid, then in step 686 MEGACO registration process exchange continues until the data exchange is complete. The process may then terminate, as shown.

Thus, the Service Gateway 170 may mediate a remote registration process between a client using an IP telephone 120 and a Media Gateway Controller 150 which performs the registration.

One of the benefits of the present system is that the customer's system components may be configured and/or reconfigured remotely by downloading new software from the system, i.e., complex on-site servicing for service upgrades or modifications may be reduced or eliminated by the present system and method.

Figure 7A:
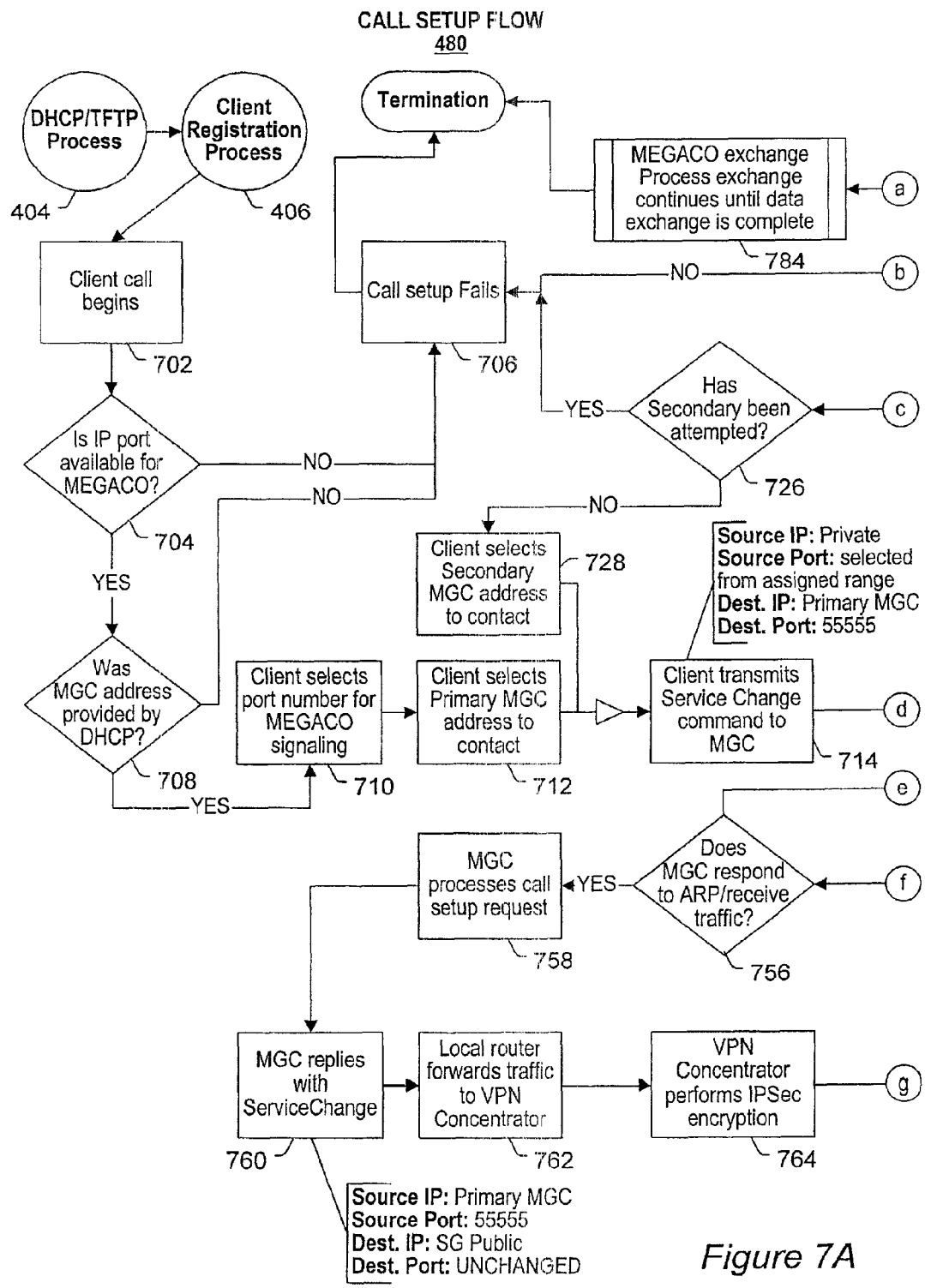
FIGS. 7A, 7B and 7C flowchart a Call Setup process, according to one embodiment of the invention.
Figure 7B:
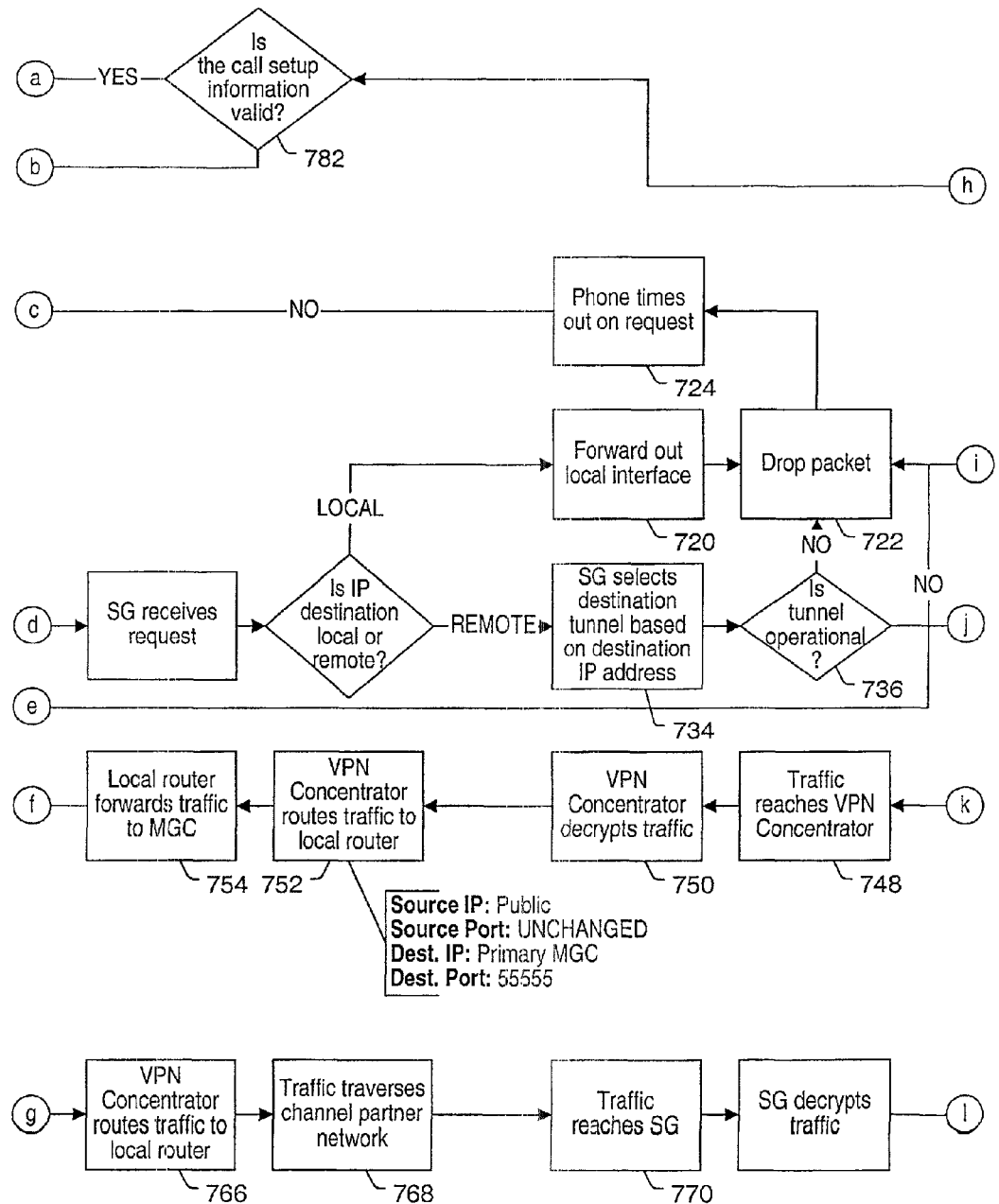
Figure 7C:
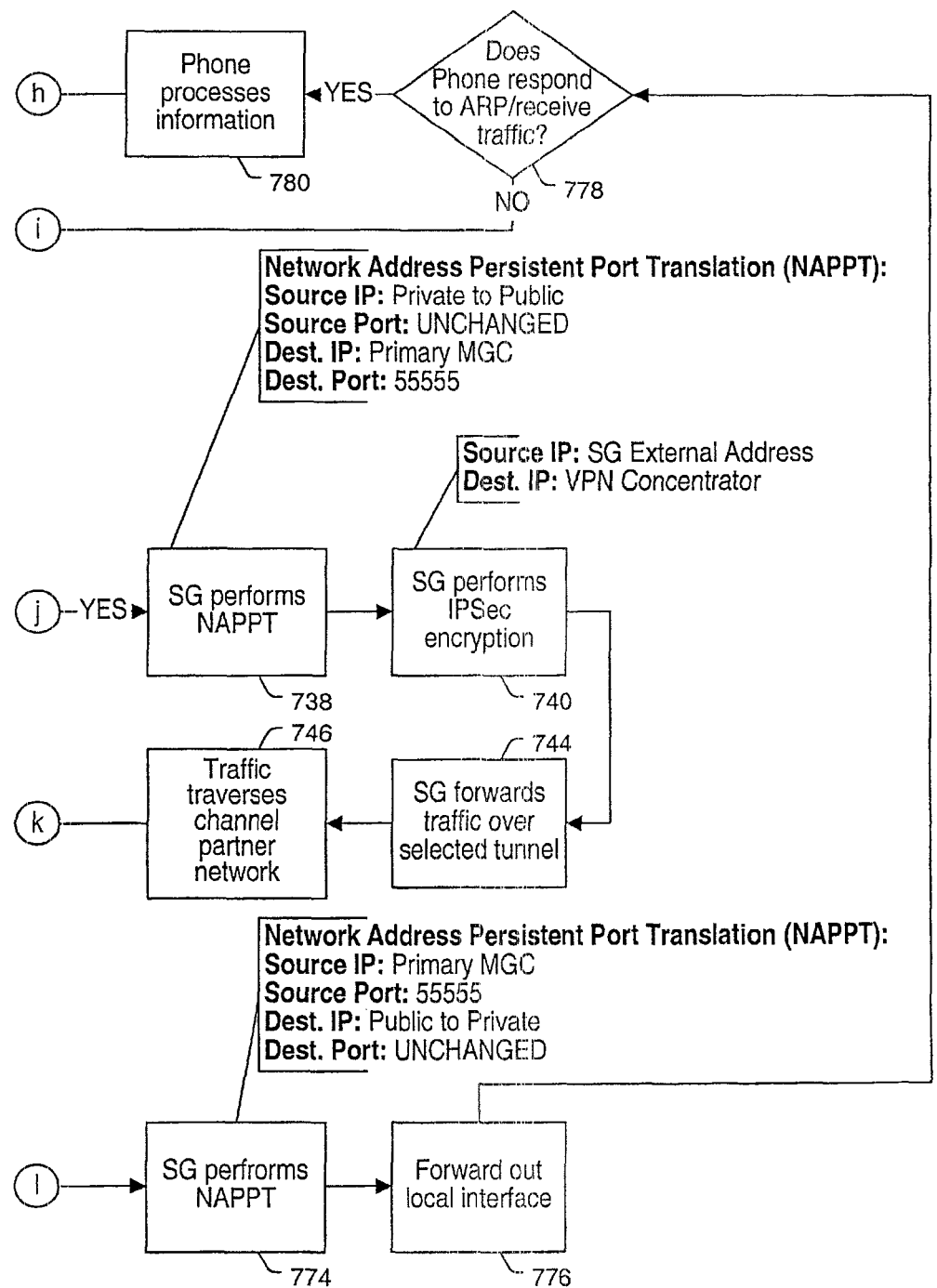

FIGS. 7A, 7B and 7C—IP Telephone Client Call Setup Process

FIGS. 7A, 7B and 7C show a flowchart for a client Call Setup process, according to one embodiment of the invention. As shown, the Call Setup process preferably occurs after the DHCP/TFTP process 404 and the client registration process 406, described above. It should be noted that this particular embodiment uses the MEGACO standard, although other protocols and standards may be implemented as desired. It is further noted that various of the steps shown may be performed in different orders or omitted, or various additional steps may be performed as desired.

In step 702, the client call may begin. In the preferred embodiment, the call may be initiated by a client activating the IP telephone 120, e.g., by picking up the receiver, and dialing a destination telephone number.

In step 704, the system may determine if an IP port is available for MEGACO, and if an IP port is not available, then in step 706 the Call Setup may fail and the process may terminate.

If an IP port is available, then in 708 the system may determine if a Media Gateway Controller (MGC) address was provided by DHCP. If the MGC address was not provided, then the Call Setup may fail, as indicated in step 706, and the process may terminate.

If the MGC address was provided by DHCP, then in step 710 the client may select a port number for MEGACO signaling. In the preferred embodiment, the port number may be selected from the range of port numbers assigned to the IP telephone client in the DHCP lease negotiation process 404, as described above with reference to FIGS. 5A and 5B.

In step 712 the client may select a primary MGC address to contact, and in step 714, may transmit a Service Change command to the MGC 150. An example packet header is shown as part of 714, comprising a source IP address, denoted as Private, a source port, selected from the assigned port range, as indicated, a destination IP address, here shown as the Primary MGC address, and a destination port, here shown with an arbitrary example value of 55555.

In step 716 the Service Gateway (SG) 170 may receive the Service Change command or request. Then, in 718, the SG 170 may determine if the IP destination is local or remote. The terms "local" and "remote" refer to call destinations in the customer network which are inside, or outside, respectively, of the originating IP telephone's IP subnet. In other words, if the destination is local, then the call may be sent directly to the destination IP telephone 120, without having to be transmitted through a Service Gateway 170.

If the IP destination is local, then in step 720 Call Setup data may be forwarded out the local interface, and in step 722, the packet may be dropped. Then, in step 724, after a suitable waiting period, the IP telephone 120 may time out on the request.

After the IP telephone 120 times out on the request, then in 726 the system may determine if a secondary has been attempted, i.e., if a secondary MGC address has been tried.

If a secondary MGC address has been attempted, then the Call Setup may fail, as indicated in step 706, and the process may terminate.

If a secondary MGC address has not been attempted, then in 728 the client may select a secondary MGC address to contact, and the process may continue with step 714, as described above.

Referring back to step 718, if the IP destination is determined to be remote, then in 734 the Service Gateway 170 may select a destination tunnel based on the destination IP address.

In step 736 the system may determine if the selected tunnel is operational. If the tunnel is not operational, then the packet (Call Setup data) may be dropped, as indicated in 722, and the process may continue as described above.

If the tunnel is operational, then in step 738 the Service Gateway 170 may perform Network Address Persistent Port Translation (NAPPT) on the Call Setup data. As indicated, the packet header information at this stage may change in the following way: the source IP address may be changed from Private to Public, while the source port remains UNCHANGED; the destination IP address may remain set to the primary MGC address; and the destination port may retain the example value 55555.

In step 740 the Service Gateway 170 may perform IP Security (IPSec) encryption on the Call Setup data. In one embodiment, the packet header information may include the following changes: the source IP address may be set to a Public NAT address, and the destination IP address may be set to the VPN Concentrator. The source and destination port information may remain unchanged.

In step 744, the Service Gateway 170 may forward the Call Setup data over the selected tunnel. The Call Setup data may then traverse the channel partner network, e.g., the network of an ISP, as indicated in step 746.

In step 748, the Call Setup data may reach a Virtual Private Network (VPN) Concentrator 136, which may decrypt the Call Setup data as shown in step 750. Then, in step 752, the VPN Concentrator 136 may route the Call Setup data to a local router. As shown, in one embodiment, the data packet header information at this point may include a source IP address, indicated as Public, a source port which remains UNCHANGED, as shown, a destination IP address set to the primary address of the MGC, and a destination port with the example value of 55555.

Then, the local router may forward the Call Setup data to the MGC 150, as indicated in step 754.

In step 756, the system may determine if the MGC 150 responds to Address Resolution Protocol (ARP), i.e., if the MGC 150 receives the Call Setup data. If the MGC 150 does not receive the Call Setup data, then in step 722, the packet (Call Setup data) may be dropped, and the process may continue as described above.

If the MGC 150 does receive the Call Setup data, then in step 758 the MGC 150 may process the Call Setup request, and in step 760, may reply with a Service Change. In one embodiment, the packet header for the data now may now include the source IP address and port set to the Primary MGC address and the example value 55555. As indicated, the destination information may include the destination IP address set to the SG public address, and the destination port remaining UNCHANGED.

In step 762, a local router may forward the Call Setup data to the VPN Concentrator 136, which may perform IPSec encryption on the data, as indicated in step 764. The VPN Concentrator 136 may then route the Call Setup data to a local router, as shown in step 766.

In step 768 the Call Setup data may traverse the channel partner network, i.e., the network of the ISP, and in step 770, may reach the Service Gateway 170. In step 772 the Service Gateway 170 may decrypt the Call Setup data, then perform Network Address Persistent Port Translation (NAPPT), as shown in step 774. The packet header information may be modified such that the source IP address is set to the primary MGC address, the source port is set to the example value 55555, the destination IP address is changed from Public to Private, and the destination port remains UNCHANGED.

The SG 170 may then forward the Call Setup data out the local interface, as indicated in step 776.

In step 778, the system may determine if the IP telephone 120 responds to Address Resolution Protocol (ARP), i.e., receives the Call Setup data. If the IP telephone 120 does not receive the Call Setup data, then the process may continue with step 722, as described above. If the IP telephone 120 receives the Call Setup data, then in 780 the IP telephone 120 may process the information, i.e., the Call Setup data.

In step 782, the IP telephone may determine if the Call Setup information is valid. If the Call Setup information is not valid, then in 706 the Call Setup may fail, and the process may terminate. If the Call Setup information is valid, then in step 784 the MEGACO exchange process exchange may continue until data exchange is complete, and the process may terminate.

Figure 8A:
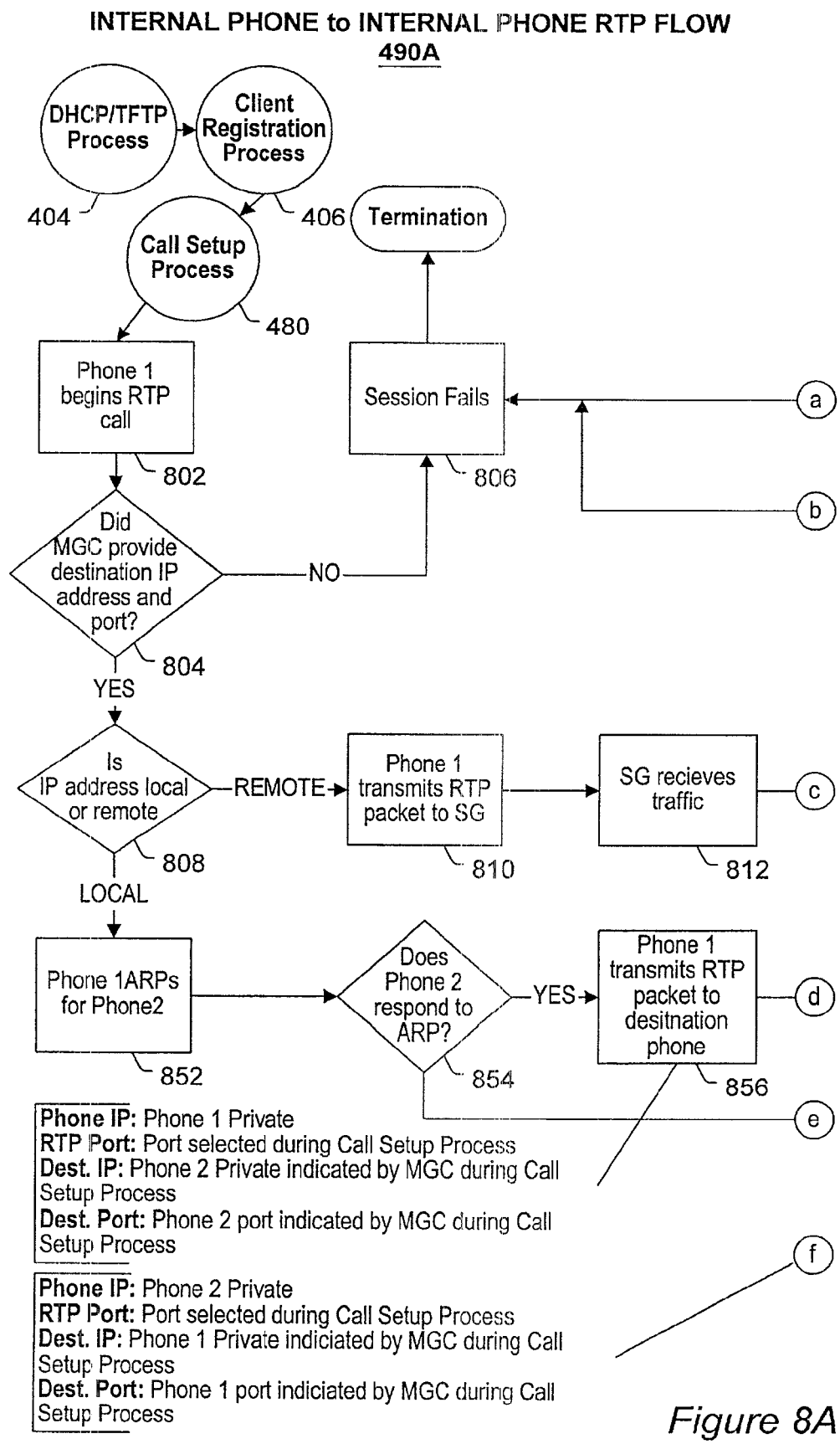
FIGS. 8A, 8B and 8C flowchart an internal IP telephone to internal IP telephone RTP flow, according to one embodiment of the invention.
Figure 8B:
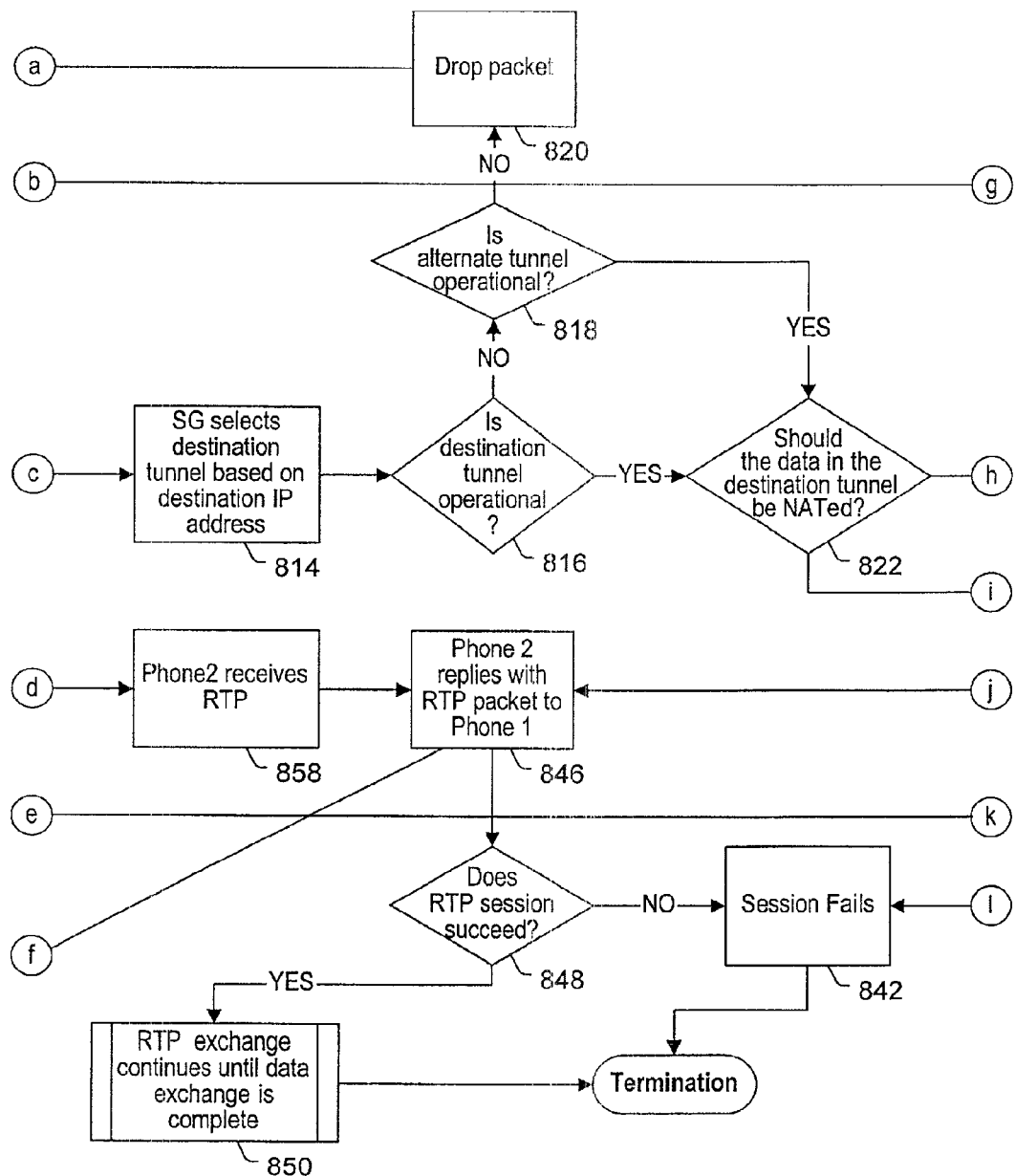
Figure 8C:
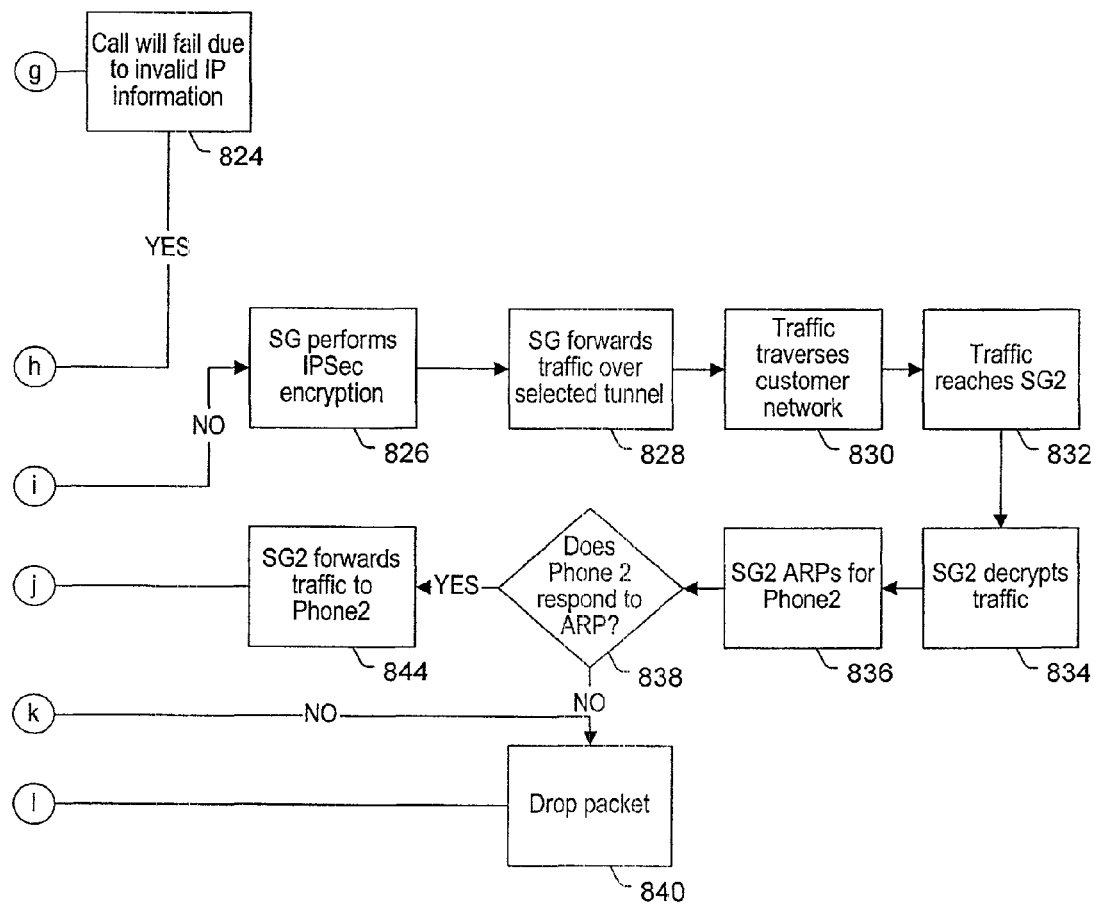

FIGS. 8A, 8B and 8C—Internal IP Telephone To Internal IP Telephone RTP Flow FIGS. 8A, 8B, and 8C flowchart Real-Time Transport Protocol (RTP) data flow between a first internal IP telephone 120A and a second internal IP telephone 120B, related to a call initiated by the first internal IP telephone 120A. RTP is an Internet Protocol for transmitting real-time data such as audio and video. RTP itself does not guarantee real-time delivery of data, but it does provide mechanisms for the sending and receiving applications to support streaming data. Typically, RTP runs on top of the UDP protocol, although the specification is general enough to support other transport protocols. It is noted that FIGS. 8A, 8B, and 8C illustrate one exemplary embodiment of data flow, and that this flow may occur in various manners according to the present invention. It is further noted that various of the steps shown may be performed in different orders or omitted, or various additional steps may be performed as desired.

As shown, the RTP call process preferably occurs after the DHCP/TFTP process 404, the client registration process 406, and the Call Setup process 480, described above with reference to FIGS. 5A-7C.

In step 802, IP telephone 120A may begin an RTP call to IP telephone 120B. As noted above, in this embodiment, both IP telephones 120 are internal to the local network.

In step 804 the system may determine if the MGC 150 provided a destination IP address and port. If the MGC 150 did not provide a destination IP address and port, then in step 806 the session mail fail, and the process may terminate. If the MGC 150 did provide a destination IP address and port, then in step 808, the system may determine if the IP address is local or remote. The terms "local" and "remote" refer to call destinations in the customer network which are inside, or outside, respectively, of the originating IP telephone's IP subnet. In other words, if the destination is local, then the call may be sent directly to the destination IP telephone 120, without having to be transmitted through a Service Gateway 170.

If the IP address is remote, then in step 810 the IP telephone 120A may transmit an RTP packet to Service Gateway (SG) 170A, which may receive the packet in step 812, and select a destination tunnel based on the destination IP address, as indicated in step 814.

In step 816, the SG 170A may determine if the destination tunnel is operational. If the destination tunnel is not operational, then in 818, the SG 170A may determine if an alternate tunnel is operational. If no alternate tunnel is available, then in step 820 the packet may be dropped, the session may fail, as indicated in step 806, and the process may terminate.

If an alternate tunnel is available, then the process may continue with step 822, described below.

Referring back to step 816, if the destination tunnel is operational, then in step 822 the SG 170A may determine if the data in the destination tunnel should be NATed, i.e., if Network Address Translation should be performed on the data. Note that if the data should be NATed, then the packet may be assumed to have an external destination, and so has been inappropriately routed to the wrong interface (local). Therefore, if NAT is to be performed, then in step 824 the call may fail due to invalid IP information, the session may fail, as indicated in step 806, and the process may terminate.

If the destination tunnel does not need to be NATed, then in step 826 the SG 170A may perform IPSec encryption on the data (packet), and forward the data over the selected tunnel, as indicated in step 828. In step 830, the data may traverse the customer network, and may reach a second Service Gateway 170B, as shown in step 832.

In step 834, the SG 170B may decrypt the data, and in step 836, may ARP for the IP telephone 120B. In step 838, the system may determine if the IP telephone 120B responds to the ARP. If the IP telephone 120B does not respond to the ARP, then in step 840 the packet may be dropped, the session may fail, as indicated in step 842, and the process may terminate.

If the IP telephone 120B responds to the ARP, then in step 844 the SG 170B may forward the data to IP telephone 120B. In step 846, the IP telephone 120B may reply with an RTP packet to IP telephone 120A. In step 848, the system may determine if the RTP session succeeded. If the RTP session did not succeed, then the session may fail, as indicated in step 842, and the process may terminate.

If the RTP session succeeded, then in step 850, the RTP exchange may continue until data exchange is complete.

Referring back to step 808, if the IP address is determined to be local, then in step 852 the IP telephone 120A may ARP for IP telephone 120B.

In step 854, the system may determine if the IP telephone 120B responds to the ARP. If the IP telephone 120B does not respond to the ARP, then in step 840 the packet may be dropped, the session may fail, as indicated in step 842, and the process may terminate.

If the IP telephone 120B responds to the ARP, then in step 856 IP telephone 120A may transmit the RTP packet to IP telephone 120B. An example packet header is shown as part of 856, comprising a source IP address, denoted as Phone 1 Private, a source port, selected from the assigned port range during the Call Setup process 480, as indicated, a destination IP address, here shown as Phone 2 Private indicated by MGC during Call Setup process, and a destination port, shown as Phone 2 port indicated by MGC during Call Setup Process.

In step 858, the IP telephone 120B may receive the RTP packet, and in step 846, the IP telephone 120B may reply with an RTP packet to IP telephone 120A. In one embodiment, the packet header may now include a source IP address, denoted as Phone 2 Private, a source port, selected from the assigned port range during the Call Setup process 480, as indicated, a destination IP address, here shown as Phone 1 Private indicated by MGC during Call Setup process, and a destination port, shown as Phone 1 port indicated by MGC during Call Setup Process.

In step 848, the system may determine if the RTP session succeeded. If the RTP session did not succeed, then the session may fail, as indicated in step 842, and the process may terminate.

If the RTP session succeeded, then in step 850, the RTP exchange may continue until data exchange is complete, at which time the process may terminate.

Thus, in one embodiment, internal IP telephone calls within the same IP subnet may be transmitted directly between IP telephones 120, while IP telephone calls made between internal IP telephones 120 in different IP subnets may be routed through Service Gateways 170.

Figure 9A:
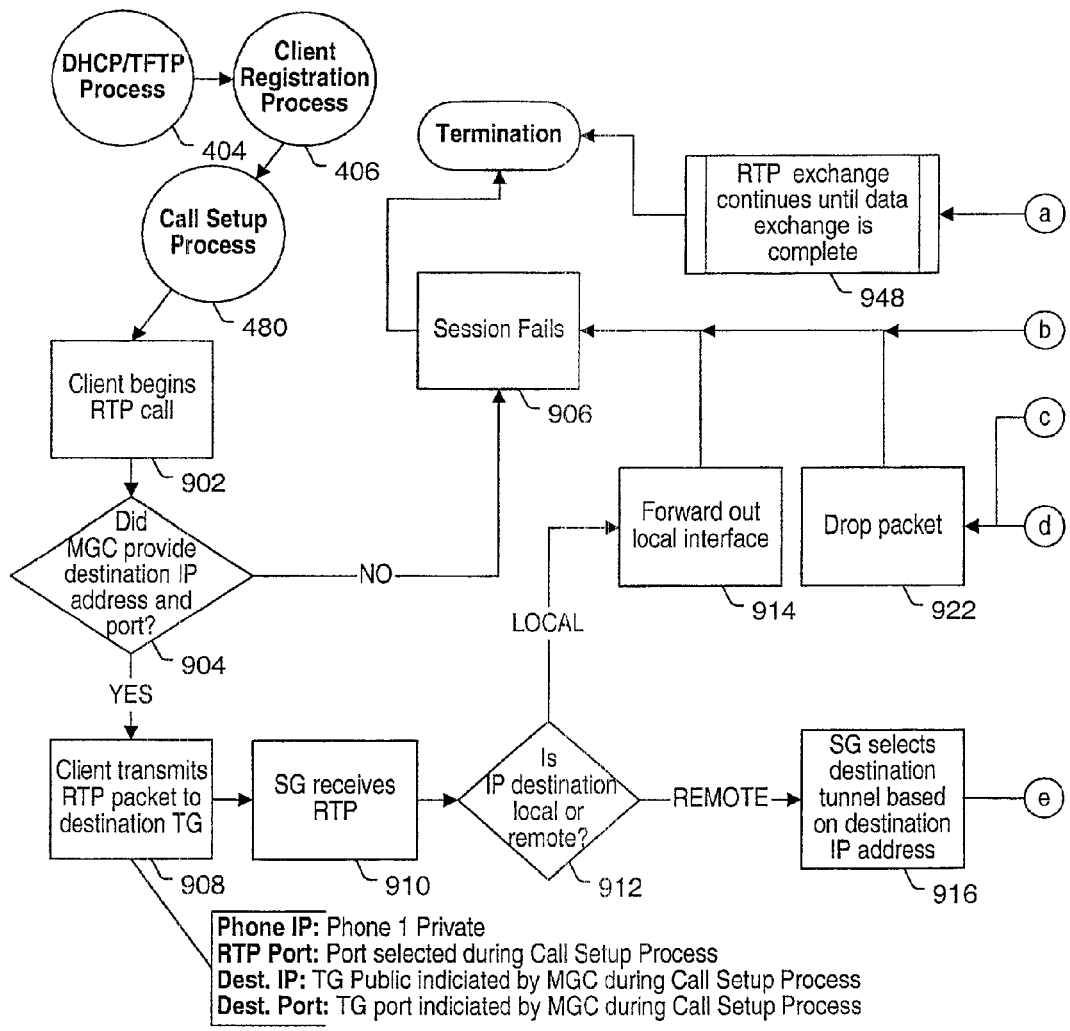
FIGS. 9A, 9B and 9C flowchart an IP telephone to Trunking Gateway RTP flow, according to one embodiment of the invention.
Figure 9B:
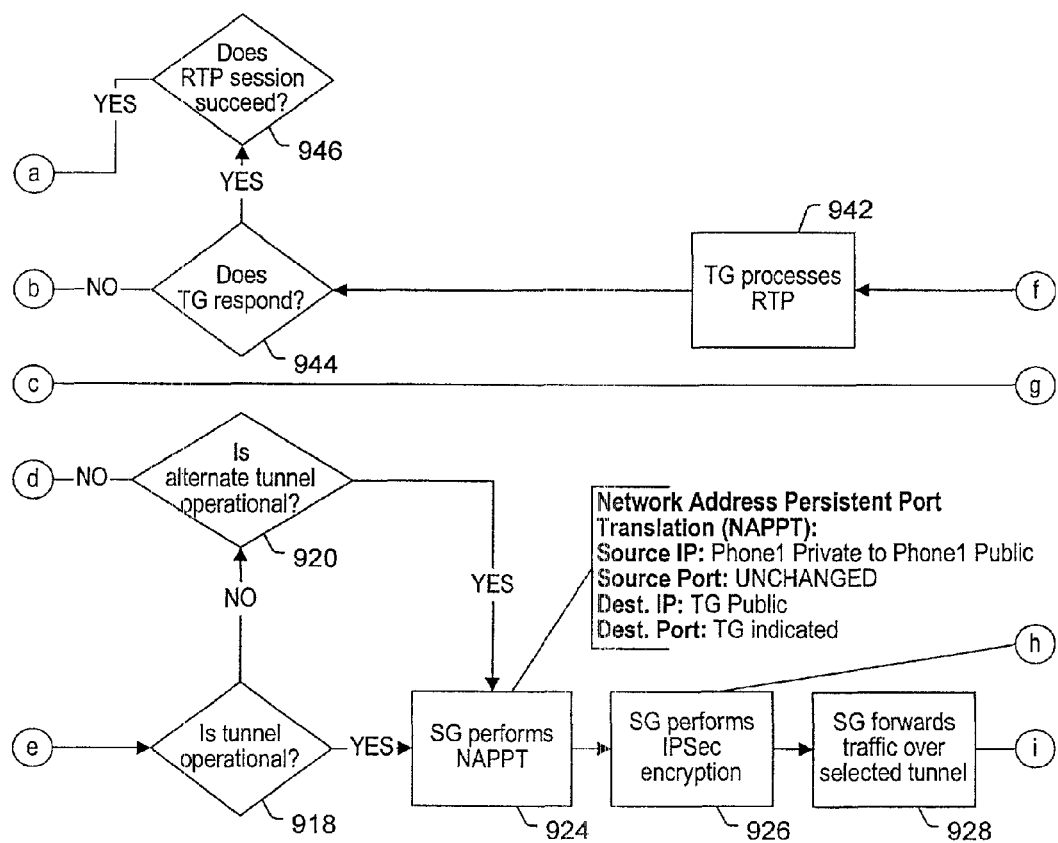
Figure 9C:
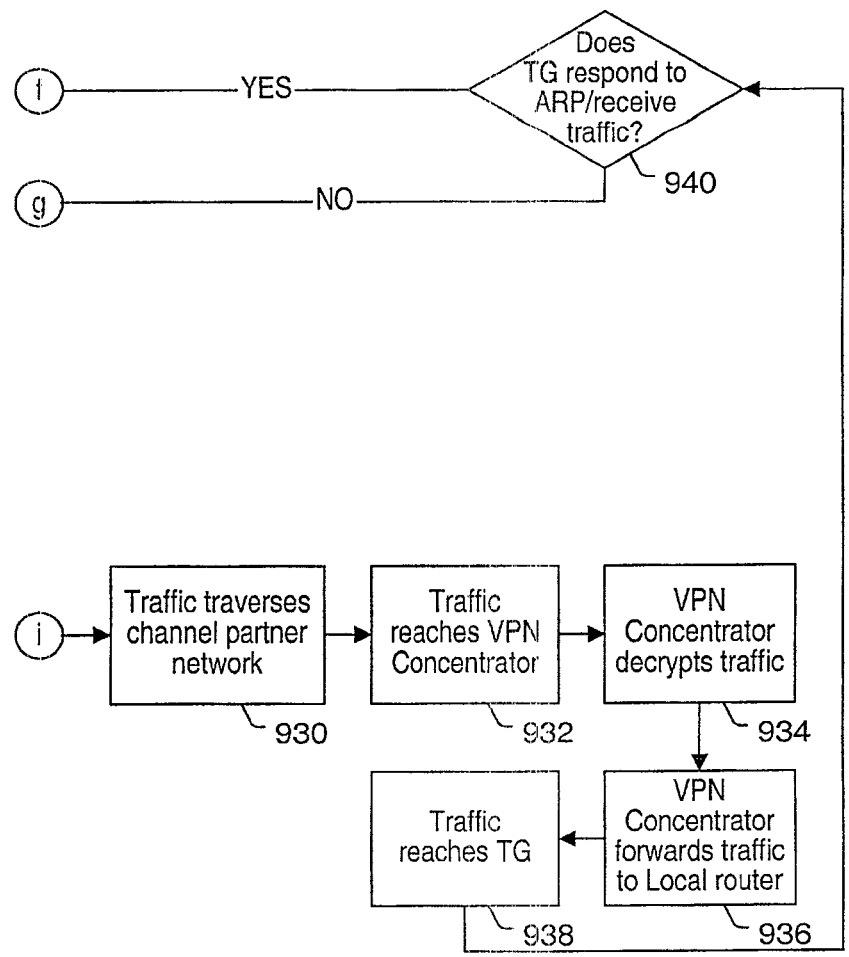

FIGS. 9A, 9B and 9C—IP Telephone To Trunking Gateway RTP Flow

FIGS. 9A, 9B, and 9C flowchart RTP data flow from an IP telephone 120 to a Trunking Gateway 160 related to a client initiated IP telephone call. It is noted that FIGS. 9A, 9B, and 9B illustrate one exemplary embodiment of data flow, and that this flow may occur in various manners according to the present invention. It is further noted that various of the steps shown may be performed in different orders or omitted, or various additional steps may be performed as desired.

As shown, the RTP call process preferably occurs after the DHCP/TFTP process 404, the client registration process 406, and the Call Setup process 480, described above with reference to FIGS. 5A-7C.

In step 902, the client may begin an RTP call. In the preferred embodiment, the client initiates the call through IP telephone 120.

In step 904 the system may determine if the MGC 150 provided a destination IP address and port. If the MGC 150 did not provide a destination IP address and port, then in step 906 the session mail fail, and the process may terminate. If the MGC 150 did provide a destination IP address and port, then in step 908, the client may transmit an RTP packet to the destination Trunking Gateway (TG) 160. An example packet header is shown as part of 908, comprising a source IP address, denoted as Phone 1 Private, a source port, selected from the assigned port range during the Call Setup process 480, as indicated, a destination IP address, here shown as TG Public indicated by MGC during the Call Setup process, and a destination port, shown as TG port indicated by MGC during the Call Setup process.

In step 910, Service Gateway 170 may receive the RTP packet, and in step 912, may determine if the IP destination is local or remote. If the IP destination is determined to be local then in step 914 the data (packet) may be forwarded out through the local interface, in step 906 the session may fail, and the process may terminate.

If the IP destination is remote, then in step 916, the SG 170 may select a destination tunnel based on the destination IP address. In step 918, the SG 170 may determine if the destination tunnel is operational. If the destination tunnel is not operational, then in 920, the SG 170 may determine if an alternate tunnel is available. If no alternate tunnel is available, then in step 922 the packet may be dropped, the session may fail, as indicated in step 906, and the process may terminate.

If an alternate tunnel is available, then the process may continue with step 924, described below.

Referring back to step 918, if the destination tunnel is operational, then in step 924 the SG 170 may perform NAPPT (Network Address Persistent Port Translation) on the data. In one embodiment, the packet header information may be modified such that the source IP address is set from Phone 1 Private to Phone 1 Public, the source port remains UNCHANGED, the destination IP address is set to the TG Public address, and the destination port as indicated by the TG.

In step 926, the SG 170 may perform IPSec encryption on the data. In one embodiment, the packet header information may include the following changes: the source IP address is set to a Public NAT address, and the destination IP address is set to that of the VPN Concentrator. The source and destination port information may remain unchanged.

In step 928, the SG 170 may forward the data over the selected tunnel. Then, in step 930, the data may traverse a channel partner network, i.e., the network of an ISP, and in step 932 the data may reach a VPN Concentrator 136. The VPN Concentrator 136 may decrypt the data, as indicated in step 934, then, in step 936, may forward the data to a local router.

In step 938 the data may reach the TG 160. In step 940, the system may determine if the TG 160 receives the data. If the TG 160 does not respond to the data, then the packet may be dropped, as indicated in step 922, the session may fail in step 906, and the process may terminate.

If the TG 160 does receive the data, then in step 942, the TG may process the RTP data. In step 944, the system may determine if the TG 160 responds. If the TG 160 does not respond, then the session may fail, as indicated in step 906, and the process may terminate.

If the TG 160 does respond, then the system may determine if the RTP session succeeds, as indicated in step 946. If the RTP session does succeed, then in step 948, the RTP exchange may continue until data exchange is complete, and the process may terminate.

Figure 10A:
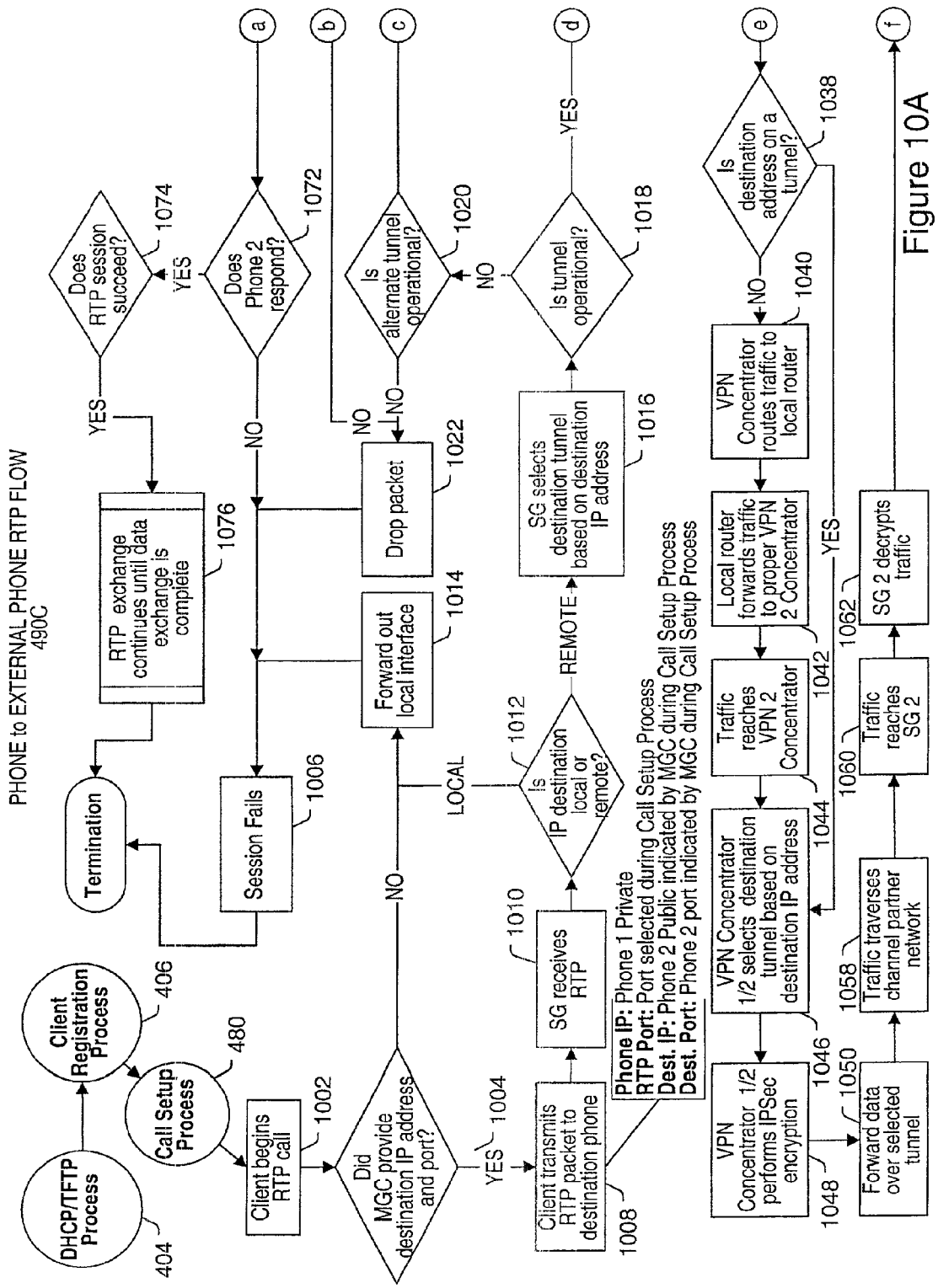
FIGS. 10A and 10B flowchart an internal IP telephone to external IP telephone RTP flow, according to one embodiment of the invention.
Figure 10B:
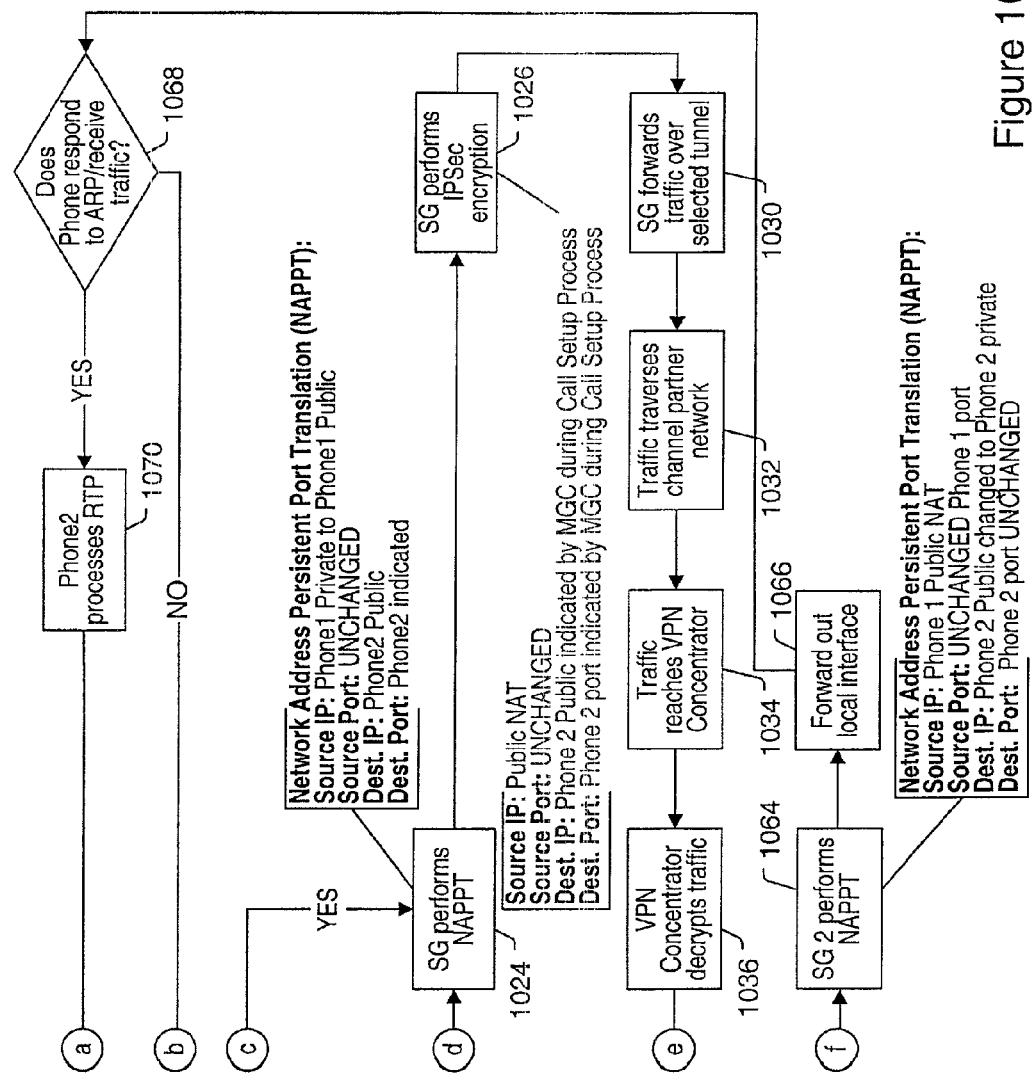

FIGS. 10A and 10B—IP Telephone to External IP Telephone RTP Flow

FIGS. 10A and 10B flowchart RTP data flow between an internal IP telephone 120A and an external IP telephone 120C, related to a call initiated by the first internal IP telephone 120A. It is noted that FIGS. 10A and 10B illustrate one exemplary embodiment of data flow, and that this flow may occur in various manners according to the present invention. It is further noted that various of the steps shown may be performed in different orders or omitted, or various additional steps may be performed as desired.

As shown, the RTP call process preferably occurs after the DHCP/TFTP process 404, the client registration process 406, and the Call Setup process 480, described above with reference to FIGS. 5A-7C.

In step 1002, IP telephone 120A may begin an RTP call to an external IP telephone 120C.

In step 1004 the system may determine if the MGC 150 provided a destination IP address and port. If the MGC 150 did not provide a destination IP address and port, then in step 1006 the session mail fail, and the process may terminate. If the MGC 150 did provide a destination IP address and port, then in step 1008, the client may transmit an RTP packet to the destination telephone, i.e., IP telephone 120C. In one embodiment, the packet header for the data now may include the source IP address set to Phone 1 Private, the RTP port set to the port selected during the Call Setup process, the destination IP address, set to Phone 2 Public indicated by the MGC during the Call Setup process, and the destination port, set to Phone 2 port indicated by the MGC during the Call Setup process.

In step 1010, the Service Gateway (SG) 170 may receive the RTP (packet), and in step 1012, may determine if the IP destination is local or remote. The terms "local" and "remote" refer to call destinations in the customer network which are inside, or outside, respectively, of the originating IP telephone's IP subnet. In other words, if the destination is local, then the call may be sent directly to the destination IP telephone 120, without having to be transmitted through a Service Gateway 170.

If the IP destination is local, then in step 1014 the packet may be forwarded out through the local interface, the session may fail, as indicated in 1006, and the process may terminate.

If the IP address is determined to be remote, then in step 1016 the SG 170 may select a destination tunnel based on the destination IP address.

In step 1018, the SG 170 may determine if the destination tunnel is operational. If the destination tunnel is not operational, then in 1020, the SG 170 may determine if an alternate tunnel is available. If no alternate tunnel is available, then in step 1022 the packet may be dropped, the session may fail, as indicated in step 1006, and the process may terminate.

If an alternate tunnel is available, then the process may continue with step 1024, described below.

Referring back to step 1016, if the destination tunnel is operational, then in step 1024 the SG 170 may perform NAPPT on the call data, i.e., the packet. In one embodiment, the packet header information may be changed as follows: the source IP address may be changed from Phone 1 Private to Phone 1 Public, the source port may remain UNCHANGED, the destination IP address may be set to Phone 2 Public, and the destination port may be set to Phone 2, as indicated.

In step 1026 the SG 170 may perform IPSec encryption on the call data (packet). The original packet is encapsulated in a new packet with a source address of the external interface address of the Service Gateway, and the destination address on the VPN Concentrator. In 1030, the SG 170 may forward the data over the selected tunnel. In step 1032, the data may traverse the customer network, and may reach a VPN Concentrator 136A, as shown in step 1034. In step 1036, the VPN Concentrator 136A may decrypt the call data.

In step 1038, the VPN Concentrator 136A may determine if the destination route is local or on a tunnel. It should be noted that, depending upon whether the destination route used a local gateway or a tunnel, a second VPN Concentrator 136B or the first VPN Concentrator 136A, respectively, performs the steps 1046 and 1048, below, as shown.

If the destination route uses a local gateway, then in step 1040, the VPN Concentrator 136A may route the call data to a local router, which may forward the data to a second VPN Concentrator 136B, as indicated in step 1042. In step 1044 the data may reach the second VPN Concentrator 136B, which may select a destination tunnel based on the destination IP address, as indicated in step 1046. In step 1048, the second VPN Concentrator 136B may perform IPSec encryption on the data.

Referring back to step 1038, if the destination route is on a tunnel, then in step 1046, the VPN Concentrator 136A may select a destination tunnel based on the destination IP address, as indicated in step 1046. In step 1048, the VPN Concentrator 136A may perform IPSec encryption on the data.

In step 1050, the data may be forwarded over the selected tunnel. Then, in step 1058 the data may traverse the channel partner network, and in step 1060 may reach the second SG 170B. The second SG 170B may decrypt the data, as indicated in step 1062, perform NAPPT in step 1064. In one embodiment, the packet header may now include a source IP address, set to Phone 1 Public NAT, a source port which remains the UNCHANGED Phone 1 port, a destination IP address, changed from Phone 2 Public to Phone 2 Private, and a destination port which remains as the UNCHANGED Phone 2 port.

Then, the second SG 170B may forward the data out through the local interface, as shown in step 1066.

In step 1068, the system may determine if the IP telephone 120A receives the data, i.e., responds to ARP. If the IP telephone 120A does not receive the data, then the packet may be dropped, as indicated in step 1022, the session may fail and the process may terminate. If the IP telephone 120A does receive the data, then in step 1070 the second IP telephone 120B may process the RTP data.

In step 1072, the system may determine if IP telephone 120B responds, i.e., receives the data. If IP telephone 120B does not respond, then the session may fail, as indicated in step 1006, and the process may terminate. If IP telephone 120B responds, then in step 1074 the system may determine if the RTP session succeeds.

If the RTP session succeeded, then in step 1076, the RTP exchange may continue until data exchange is complete, and the process may terminate.

Figure 11:
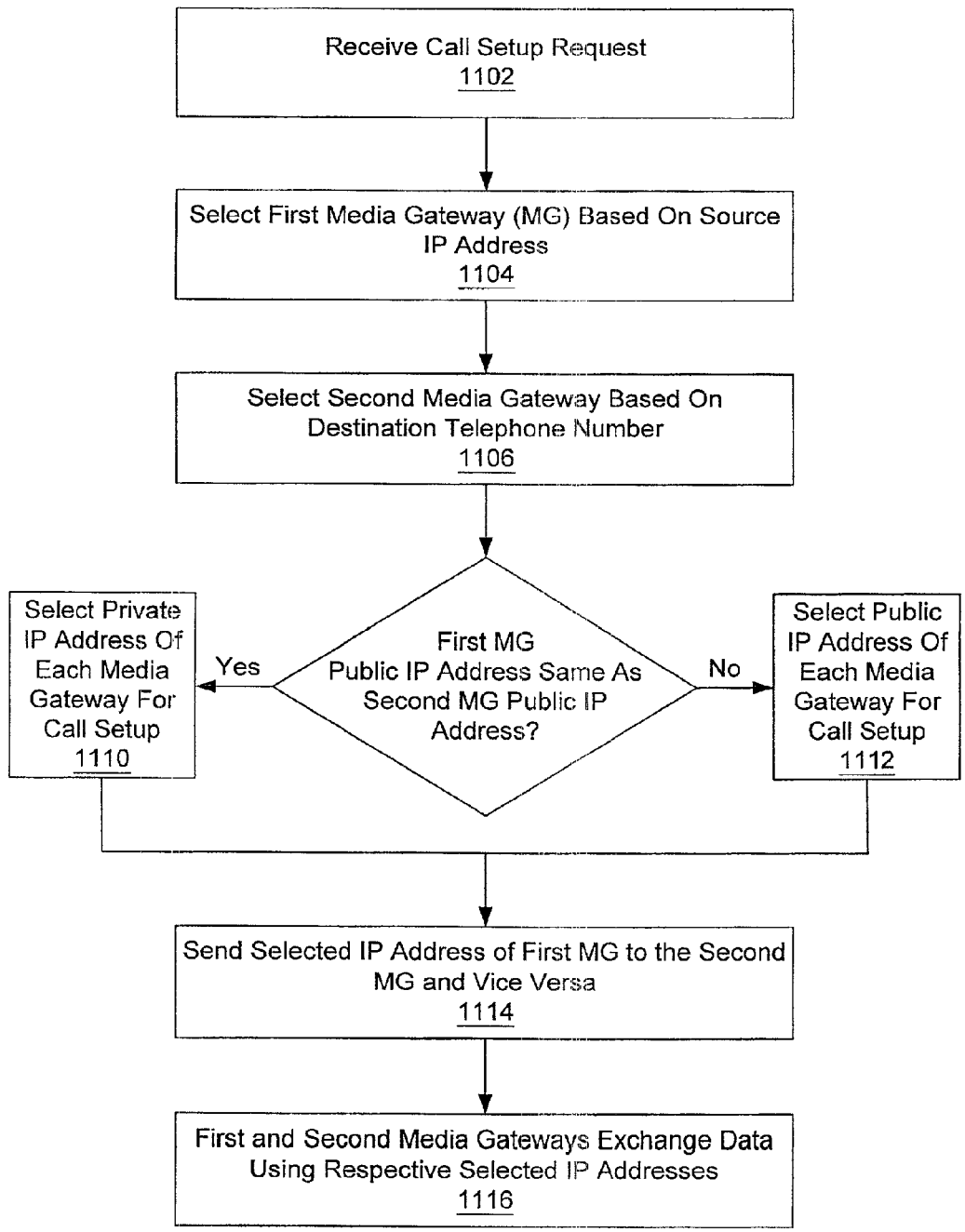
FIG. 11 flowcharts a solution to the triangle problem, according to one embodiment.

FIG. 11: A Solution to the Triangle Problem

FIG. 11 illustrates one embodiment of a solution to the triangle problem, described above, which may be implemented by various embodiments of the present invention. It is noted that FIG. 11 illustrates one exemplary embodiment of the triangle problem solution process, and that this solution process may be performed in various manners according to the present invention. It is further noted that various of the steps shown may be performed in different orders or omitted, or various additional steps may be performed as desired.

As FIG. 11 shows, in 1102, a Call Setup request may be received. In one embodiment, the Call Setup request may include a source IP address and a destination telephone number.

In 1104, a first Media Gateway may be selected based on the source IP address. For example, in one embodiment, the first Media Gateway may be selected via a table look-up, where an association may be stored between source IP addresses and corresponding Media Gateways.

In 1106, a second Media Gateway may be selected based on the destination telephone number. In one embodiment, the second Media Gateway may also be selected via a table look-up, where an association may be stored between destination telephone numbers and corresponding Media Gateways.

It should be noted that in various embodiments, the first and/or second Media Gateways may be IP telephones, Trunking Gateways, Fax machines, pagers, or any other type of Media Gateway. In an embodiment where one of the Media Gateways is a Trunking Gateway, the Trunking Gateway may provide an interface to the Public Switched Telephone Network (PSTN), whereby communications with external telephony devices may be performed.

In 1108, a public IP address of the first Media Gateway may be compared to a public IP address of the second Media Gateway, and if the public IP address of the first Media Gateway is the same as the public IP address of the second Media Gateway, then in 1110, a private IP address of the first Media Gateway and a private IP address of the second Media Gateway may be selected for Call Setup.

If the public IP address of the first Media Gateway is not the same as the public IP address of the second Media Gateway, then in 1112 the public IP address of the first Media Gateway and the public IP address of the second Media Gateway may be selected for Call Setup.

In 1114, the selected IP address (whether private or public) of the first Media Gateway may be sent to the second Media Gateway, and the selected IP address of the second Media Gateway may be sent to the first Media Gateway, according to one embodiment. Thus, the Media Gateways may be provided with respective destination IP addresses for the current call session. In one embodiment, these IP addresses may be provided by a registration process prior to the Call Setup request, as described above with reference to FIGS. 4A, 4B, 6A, 6B and 6C. For example, in one embodiment, a Media Gateway may register with Media Gateway Controller 150, by sending the Media Gateway's public IP address. The public IP address may be received and stored (e.g., by the Media Gateway Controller 150) for later reference in the Call Setup process. In the case where the Media Gateway is internal to the system (as opposed to a Trunking Gateway leading to external IP devices), registering the Media Gateway (e.g., with the Media Gateway Controller 150) may also include sending a private IP address of the Media Gateway, and storing the private IP address for use as described above.

Finally, in 1116, the first Media Gateway may send data to the second Media Gateway using the selected IP address of the second Media Gateway, and the second Media Gateway may send data to the first Media Gateway using the selected IP address of the first Media Gateway. In other words, the call session between the two Media Gateways may proceed.

Thus, by receiving and storing distinguishing information related to the Media Gateways, such as IP addresses and associated telephone numbers, among others, the method may distinguish between bilateral internal call sessions and call sessions involving an internal IP telephone and an external device, e.g., an external telephone interfacing through a Trunking Gateway to an internal IP telephone.

FIGS. 2-11 illustrate various exemplary applications where the invention may be used. However, it is noted that the invention is not limited to these applications, but rather may be used in any of various applications.

Memory and Carrier Medium

The system preferably includes a memory medium on which software according to an embodiment of the present invention may be stored. The term "memory medium" is intended to include an installation medium, e.g., a CD-ROM, floppy disks, or tape device; a computer system memory or random access memory (RAM) such as DRAM, SRAM, EDO RAM, RRAM, etc.; or a non-volatile memory such as a magnetic media, e.g., a hard drive, or optical storage. The memory medium may include other types of memory as well, or combinations thereof.

In addition, the memory medium may be located in a first computer in which the software program is stored or executed, or may be located in a second different computer which connects to the first computer over a network, such as the Internet. In the latter instance, the second computer provides the program instructions to the first computer for execution. Also, the computer system may take various forms, including a personal computer system, mainframe computer system, workstation, network appliance, Internet appliance, personal digital assistant (PDA), television set-top box, or other device. In general, the term "computer system" can be broadly defined to encompass any device having at least one processor which executes instructions from a memory medium, or any device which includes programmable logic that is configurable to perform a method or algorithm.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for configuring an IP telephone, comprising:
   receiving an identifier from the IP telephone;
   determining if the identifier is valid; and
   if the identifier is valid, assigning a range of port numbers to the IP telephone based on the identifier, wherein the IP telephone is operable to use at least a subset of the range of port numbers to send or receive IP communications.

2. The method of claim 1, wherein said range of port numbers comprises ports which are not reserved for use by other IP protocols.

3. The method of claim 1, further comprising:
   mediating IP communications between the IP telephone and an IP device, wherein the IP telephone uses at least a subset of the range of port numbers to send or receive said IP communications.

4. The method of claim 3, wherein said mediating the IP communications comprises:
   receiving a data packet from the IP telephone,
   performing a network address persistent port translation (NAPPT) on the data packet; and
   sending the data packet to the IP device.

5. The method of claim 4,
   wherein the data packet comprises a private source IP address, a source port number, and destination information associated with the IP device, wherein the private source IP address comprises a private IP address of the IP telephone, and wherein the source port number comprises a port number in the assigned range of port numbers; and
   wherein said performing a network address persistent port translation (NAPPT) on the data packet comprises changing the private source IP address to a public source IP address while leaving the source port number unchanged, and wherein the public source IP address and the source port number may be used to uniquely identify the IP telephone.

6. The method of claim 3, wherein said mediating the IP communications comprises:
   receiving a data packet from the IP device;
   performing a network address persistent port translation (NAPPT) on the data packet; and
   sending the data packet to the IP telephone.

7. The method of claim 6,
   wherein the data packet comprises a public destination IP address, a destination port number; and source information associated with the IP device, wherein the destination port number comprises a port number in the assigned range of port numbers, and wherein the public destination IP address and the destination port number may be used to uniquely identify the IP telephone; and
   wherein said performing a network address persistent port translation (NAPPT) on the data packet comprises using the public destination IP address and the destination port number to uniquely identify the IP telephone, and changing the public destination IP address to a private destination IP address while leaving the destination port number unchanged, wherein the private IP address comprises an IP address of the IP telephone.

8. The method of claim 1, wherein the identifier comprises a vendor class identifier.

9. The method of claim 1, wherein said determining comprises:
   determining if a MAC ID for the IP telephone is valid.

10. The method of claim 1, wherein said identifier is comprised in a DHCP discover message, the method further comprising:
    issuing a DHCP offer to the IP telephone if the identifier is determined to be valid, wherein the DHCP offer comprises DHCP lease information based on the validated identifier;
    the IP telephone issuing a DHCP request in response to the issued DHCP offer;
    storing the DHCP lease information in response to the issued DHCP request;
    the IP telephone storing the DHCP lease information; and
    the IP telephone enabling DHCP settings comprised in the DHCP lease information.

11. The method of claim 10, wherein said DHCP lease information includes the range of port numbers and information indicating operational software for the IP telephone, the method further comprising:
    the IP telephone executing the indicated operational software to enable said IP communications.

12. The method of claim 10, wherein said DHCP lease information includes the range of port numbers and information indicating operational software for the IP telephone, the method further comprising:
    the IP telephone issuing a request for the operational software;
    providing the operational software to the IP telephone in response to the issued request; and
    the IP telephone executing the provided operational software to enable said IP communications.

13. The method of claim 12, wherein said issuing the request for the operational software comprises issuing a read request to a file transfer server, wherein said file transfer server performs said providing the operational software to the IP telephone.

14. The method of claim 13, wherein the file transfer server comprises a TFTP (Trivial File Transfer Protocol) server.

15. The method of claim 1, wherein the range of port numbers comprises one or more port numbers.

16. A system for performing IP telephony, comprising:
a network;
an IP telephone;
a Service Gateway, wherein the Service Gateway is operable to couple to the IP telephone through the network;
wherein the IP telephone is operable to send an identifier to the Service Gateway;
wherein the Service Gateway is operable to:
receive an identifier from the IP telephone;
determine if the identifier is valid; and
if the identifier is valid, assign a range of port numbers to the IP telephone based on the identifier;
wherein the IP telephone is operable to use at least a subset of the range of port numbers to send or receive IP communications.

17. The system of claim 16, wherein said range of port numbers comprises ports which are not reserved for use by other IP protocols.

18. The system of claim 16, wherein the Service Gateway is further operable to mediate IP communications between the IP telephone and an IP device.

19. The system of claim 18, wherein, in mediating the IP communications the Service Gateway is operable to:
receive a data packet from the IP telephone,
perform a network address persistent port translation (NAPPT) on the data packet; and
send the data packet to the IP device.

20. The system of claim 19,
wherein the data packet comprises a private source IP address, a source port number, and destination information associated with the IP device, wherein the private source IP address comprises a private IP address of the IP telephone, and wherein the source port number comprises a port number in the assigned range of port numbers; and
wherein said performing a network address persistent port translation (NAPPT) on the data packet comprises changing the private source IP address to a public source IP address while leaving the source port number unchanged, and wherein the public source IP address and the source port number may be used to uniquely identify the IP telephone.

21. The system of claim 18, wherein, in mediating the IP communications the Service Gateway is operable to:
receive a data packet from the IP device;
perform a network address persistent port translation (NAPPT) on the data packet; and
send the data packet to the IP telephone.

22. The system of claim 21,
wherein the data packet comprises a public destination IP address, a destination port number; and source information associated with the IP device, wherein the destination port number comprises a port number in the assigned range of port numbers, and wherein the public destination IP address and the destination port number may be used to uniquely identify the IP telephone; and
wherein said performing a network address persistent port translation (NAPPT) on the data packet comprises using the public destination IP address and the destination port number to uniquely identify the IP telephone, and changing the public destination IP address to a private destination IP address while leaving the destination port number unchanged, wherein the private IP address comprises an IP address of the IP telephone.

23. The system of claim 16, wherein the identifier comprises a vendor class identifier.

24. The system of claim 16, wherein, in determining if the identifier is valid, the Service Gateway is operable to:
determine if a MAC ID for the IP telephone is valid.

25. The system of claim 16,
wherein said identifier is comprised in a DHCP discover message, wherein the Service Gateway is further operable to:
issue a DHCP offer to the IP telephone if the identifier is determined to be valid, wherein the DHCP offer comprises DHCP lease information based on the validated identifier;
wherein the IP telephone is further operable to:
issue a DHCP request in response to the issued DHCP offer;
store the DHCP lease information; and
enable DHCP settings comprised in the DHCP lease information; and
wherein the Service Gateway is further operable to:
store the DHCP lease information in response to the issued DHCP request.

26. The system of claim 25, wherein said DHCP lease information includes the range of port numbers and information indicating operational software for the IP telephone, wherein the IP telephone is further operable to:
execute the indicated operational software to enable said IP communications.

27. The system of claim 25, wherein said DHCP lease information includes the range of port numbers and information indicating operational software for the IP telephone,
wherein the IP telephone is further operable to:
issue a request for the operational software;
wherein the Service Gateway is further operable to:
provide the operational software to the IP telephone in response to the issued request; and
wherein the IP telephone is further operable to:
execute the provided operational software to enable said IP communications.

28. The system of claim 27, wherein, in issuing the request for the operational software, the IP telephone is operable to issue a read request to a file transfer server, wherein said file transfer server is operable to provide the operational software to the IP telephone.

29. The system of claim 28, wherein the file transfer server comprises a TFTP (Trivial File Transfer Protocol) server.

30. The system of claim 16, wherein the range of port numbers comprises one or more port numbers.

31. A memory medium, wherein the memory medium stores program instructions which are executable to perform:
receiving an identifier from the IP telephone;
determining if the identifier is valid; and
if the identifier is valid, assigning a range of port numbers to the IP telephone based on the identifier, wherein the IP telephone is operable to use at least a subset of the range of port numbers to send or receive IP communications.

32. The memory medium of claim 31, wherein said range of port numbers comprises ports which are not reserved for use by other IP protocols.

33. The memory medium of claim 31, wherein the program instructions are further executable to perform:
mediating IP communications between the IP telephone and an IP device, wherein the IP telephone uses at least a subset of the range of port numbers to send or receive said IP communications.

34. The memory medium of claim 33, wherein said mediating the IP communications comprises:

receiving a data packet from the IP telephone,
performing a network address persistent port translation (NAPPT) on the data packet; and
sending the data packet to the IP device.

35. The memory medium of claim 34,
wherein the data packet comprises a private source IP address, a source port number, and destination information associated with the IP device, wherein the private source IP address comprises a private IP address of the IP telephone, and wherein the source port number comprises a port number in the assigned range of port numbers; and
wherein said performing a network address persistent port translation (NAPPT) on the data packet comprises changing the private source IP address to a public source IP address while leaving the source port number unchanged, and wherein the public source IP address and the source port number may be used to uniquely identify the IP telephone.

36. The memory medium of claim 33, wherein said mediating the IP communications comprises:
receiving a data packet from the IP device;
performing a network address persistent port translation (NAPPT) on the data packet; and
sending the data packet to the IP telephone.

37. The memory medium of claim 36,
wherein the data packet comprises a public destination IP address, a destination port number; and source information associated with the IP device, wherein the destination port number comprises a port number in the assigned range of port numbers, and wherein the public destination IP address and the destination port number may be used to uniquely identify the IP telephone; and
wherein said performing a network address persistent port translation (NAPPT) on the data packet comprises using the public destination IP address and the destination port number to uniquely identify the IP telephone, and changing the public destination IP address to a private destination IP address while leaving the destination port number unchanged, wherein the private IP address comprises an IP address of the IP telephone.

38. The memory medium of claim 31, wherein the identifier comprises a vendor class identifier.

39. The memory medium of claim 31, wherein said determining comprises:
determining if a MAC ID for the IP telephone is valid.

40. The memory medium of claim 31, wherein said identifier is comprised in a DHCP discover message, wherein the program instructions are further executable to perform:
issuing a DHCP offer to the IP telephone if the identifier is determined to be valid, wherein the DHCP offer comprises DHCP lease information based on the validated identifier;
receiving a DHCP request from the IP telephone in response to the issued DHCP offer; and
storing the DHCP lease information in response to the issued DHCP request;
wherein said program instructions comprise IP telephone program instructions which are executable to:
store the DHCP lease information; and
enable DHCP settings comprised in the DHCP lease information.

41. The memory medium of claim 40, wherein said DHCP lease information includes the range of port numbers and information indicating operational software for the IP telephone, wherein the indicated operational software is executable by the IP telephone to enable said IP communications.

42. The memory medium of claim 40, wherein said DHCP lease information includes the range of port numbers and information indicating operational software for the IP telephone, wherein the program instructions are further executable to perform:
receiving a request for the operational software from the IP telephone;
providing the operational software to the IP telephone in response to the issued request; and
wherein the provided operational software is executable by the IP telephone to enable said IP communications.

43. The memory medium of claim 42,
wherein the IP telephone program instructions are executable to issue a read request to a file transfer server;
wherein said program instructions further comprise file transfer server program instructions executable to perform said providing the operational software to the IP telephone.

44. The memory medium of claim 43, wherein the file transfer server comprises a TFTP (Trivial File Transfer Protocol) server.

45. The memory medium of claim 31, wherein the range of port numbers comprises one or more port numbers.

46. A service gateway for use in an IP telephony network, wherein the service gateway is configured to:
couple one or more IP telephones to the network;
receive an identifier from an IP telephone;
determine if the identifier is valid; and
if the identifier is valid, assign a range of port numbers to the IP telephone based on the identifier;
wherein at least a subset of the range of port numbers are usable by the IP telephone to send or receive IP communications.

47. The service gateway of claim 46, wherein said range of port numbers comprises ports which are not reserved for use by other IP protocols.

48. The service gateway of claim 46, wherein the service gateway is further configured to mediate IP communications between the IP telephone and an IP device.

49. The service gateway of claim 48, wherein, in mediating the IP communications the service gateway is further configured to:
receive a data packet from the IP telephone,
perform a network address persistent port translation (NAPPT) on the data packet; and
send the data packet to the IP device.

50. The service gateway of claim 49,
wherein the data packet comprises a private source IP address, a source port number, and destination information associated with the IP device, wherein the private source IP address comprises a private IP address of the IP telephone, and wherein the source port number comprises a port number in the assigned range of port numbers; and
wherein said performing a network address persistent port translation (NAPPT) on the data packet comprises changing the private source IP address to a public source IP address while leaving the source port number unchanged, and wherein the public source IP address and the source port number may be used to uniquely identify the IP telephone.

51. The service gateway of claim 48, wherein, in mediating the IP communications, the service gateway is further configured to:
receive a data packet from the IP device;
perform a network address persistent port translation (NAPPT) on the data packet; and
send the data packet to the IP telephone.

52. The service gateway of claim 51,
wherein the data packet comprises a public destination IP address, a destination port number; and source information associated with the IP device, wherein the destination port number comprises a port number in the assigned range of port numbers, and wherein the public destination IP address and the destination port number may be used to uniquely identify the IP telephone; and
wherein said performing a network address persistent port translation (NAPPT) on the data packet comprises using the public destination IP address and the destination port number to uniquely identify the IP telephone, and changing the public destination IP address to a private destination IP address while leaving the destination port number unchanged, wherein the private IP address comprises an IP address of the IP telephone.

53. The service gateway of claim 46, wherein the identifier comprises a vendor class identifier.

54. The service gateway of claim 46,
wherein said identifier is comprised in a DHCP discover message, wherein the service gateway is further configured to:
issue a DHCP offer to the IP telephone if the identifier is determined to be valid,
wherein the DHCP offer comprises DHCP lease information based on the validated identifier;
wherein the IP telephone is further operable to:
issue a DHCP request in response to the issued DHCP offer;
store the DHCP lease information; and
enable DHCP settings comprised in the DHCP lease information; and
wherein the service gateway is further configured to:
store the DHCP lease information in response to the issued DHCP request.

55. The service gateway of claim 54, wherein said DHCP lease information includes the range of port numbers and information indicating operational software for the IP telephone, wherein the IP telephone is further operable to:
execute the indicated operational software to enable said IP communications.

56. The service gateway of claim 54, wherein said DHCP lease information includes the range of port numbers and information indicating operational software for the IP telephone,
wherein the IP telephone is further operable to issue a request for the operational software;
wherein the service gateway is further operable to provide the operational software to the IP telephone in response to the issued request; and
wherein the IP telephone is further operable to execute the provided operational software to enable said IP communications.

57. The service gateway of claim 56, wherein, in issuing the request for the operational software, the IP telephone is operable to issue a read request to a file transfer server, wherein said file transfer server is operable to provide the operational software to the IP telephone.

58. The service gateway of claim 57, wherein the file transfer server comprises a TFTP (Trivial File Transfer Protocol) server.

59. The service gateway of claim 46, wherein the range of port numbers comprises one or more port numbers.

* * * * *